United States Patent
Luciani et al.

(10) Patent No.: US 7,174,388 B2
(45) Date of Patent: Feb. 6, 2007

(54) SYSTEM, DEVICE, AND METHOD FOR SUPPORTING VIRTUAL PRIVATE NETWORKS IN A LABEL SWITCHED COMMUNICATION NETWORK

(75) Inventors: James V. Luciani, Concord, MA (US); Andre N. Fredette, Groton, MA (US); Bill Hawe, Pepperell, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 11/301,162

(22) Filed: Dec. 12, 2005

(65) Prior Publication Data

US 2006/0095499 A1 May 4, 2006

(51) Int. Cl.
- G06F 15/173 (2006.01)
- H04L 12/28 (2006.01)
- H04L 12/56 (2006.01)
- G06F 9/00 (2006.01)
- G06F 15/16 (2006.01)
- G06F 17/00 (2006.01)

(52) U.S. Cl. .................. 709/238; 726/15; 370/351; 370/395.54

(58) Field of Classification Search .............. 709/238; 726/15; 370/351, 395.54
See application file for complete search history.

(56) References Cited

U.S. PATENT DOCUMENTS

| | | | |
|---|---|---|---|
| 6,226,751 B1 * | 5/2001 | Arrow et al. | 726/15 |
| 6,614,791 B1 * | 9/2003 | Luciani et al. | 370/395.53 |
| 7,095,740 B1 * | 8/2006 | Jagannath et al. | 370/392 |
| 2003/0088699 A1 * | 5/2003 | Luciani et al. | 709/243 |
| 2004/0095947 A1 * | 5/2004 | Luciani et al. | 370/410 |

OTHER PUBLICATIONS

Juha Heinanen et al. "VPN support with MPLS- Internet Draft." Mar. 1998. IETF. p. 1-8.*
Barbara A. Fox et al. "NHRP Support for Virtual Private Networks—Internet Draft." Jul. 1999. IEFT. p. 1-4.*
B. Fox et al. "RFC 2735: NHRP Support for Virtual Private Networks." Dec. 1999. IETF. p. 1-12.*
J. Luciani et al. "RFC 2332: NBMA Next Hop Resolution Protocol (NHRP)." Apr. 1998. IETF. p. 1-49.*

* cited by examiner

Primary Examiner—Ayaz Sheikh
Assistant Examiner—Christian LaForgia
(74) Attorney, Agent, or Firm—McGuinness + Manaras LLP

(57) ABSTRACT

A system, device, and method for supporting virtual private networks in a label switched communication network utilizes an extended Next Hop Resolution Protocol in order to establish a label switched path for a particular virtual private network. Specifically, label information and a corresponding virtual private network identifier are carried in certain Next Hop Resolution Protocol messages. A label request and a corresponding virtual private network identifier is carried in Next Hop Resolution Protocol Resolution Request messages that are forwarded hop-by-hop by a number of devices along a forward path. Label mapping information and a corresponding virtual private network identifier are carried in Next Hop Resolution Protocol reply messages that are forwarded hop-by-hop by the devices in the forward path. In various embodiments of the invention, the label information and the corresponding virtual private network identifier may be carried in a type-length-value field, and the Next Hop Resolution Protocol reply messages may be Next Hop Resolution Protocol Resolution Reply messages or novel Next Hop Resolution Protocol Label Mapping messages.

38 Claims, 16 Drawing Sheets

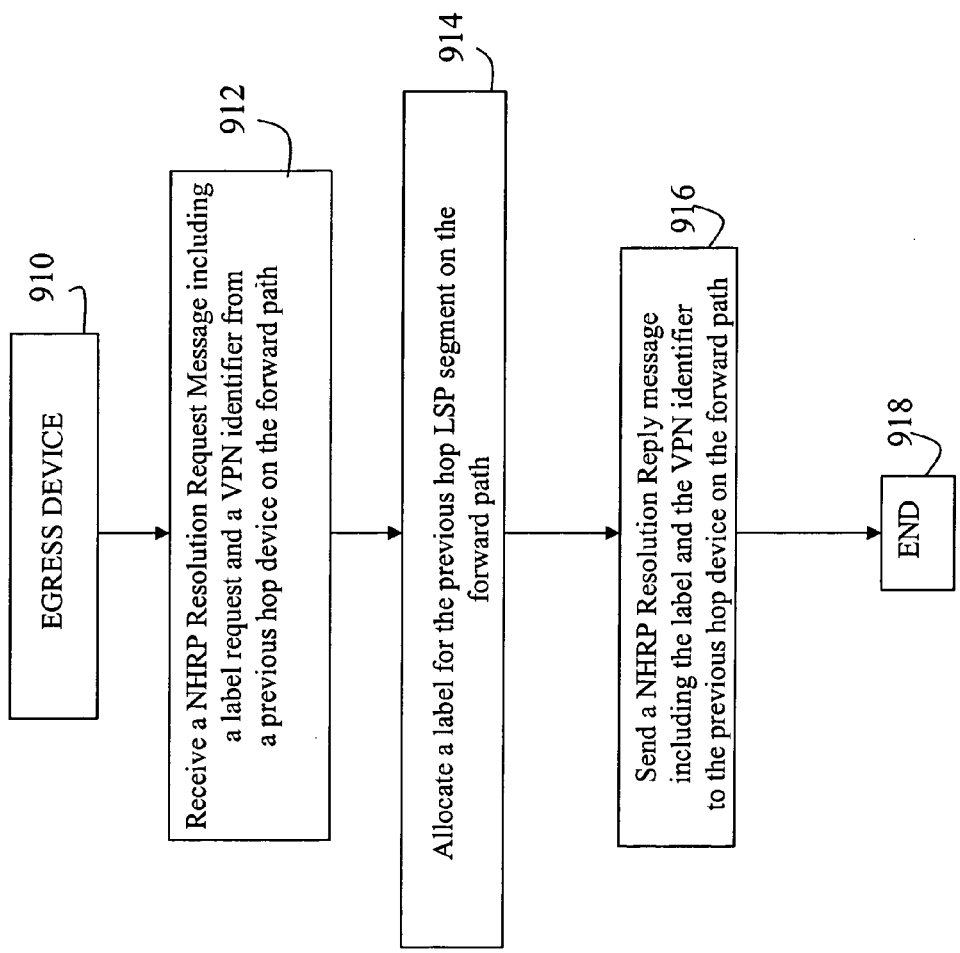

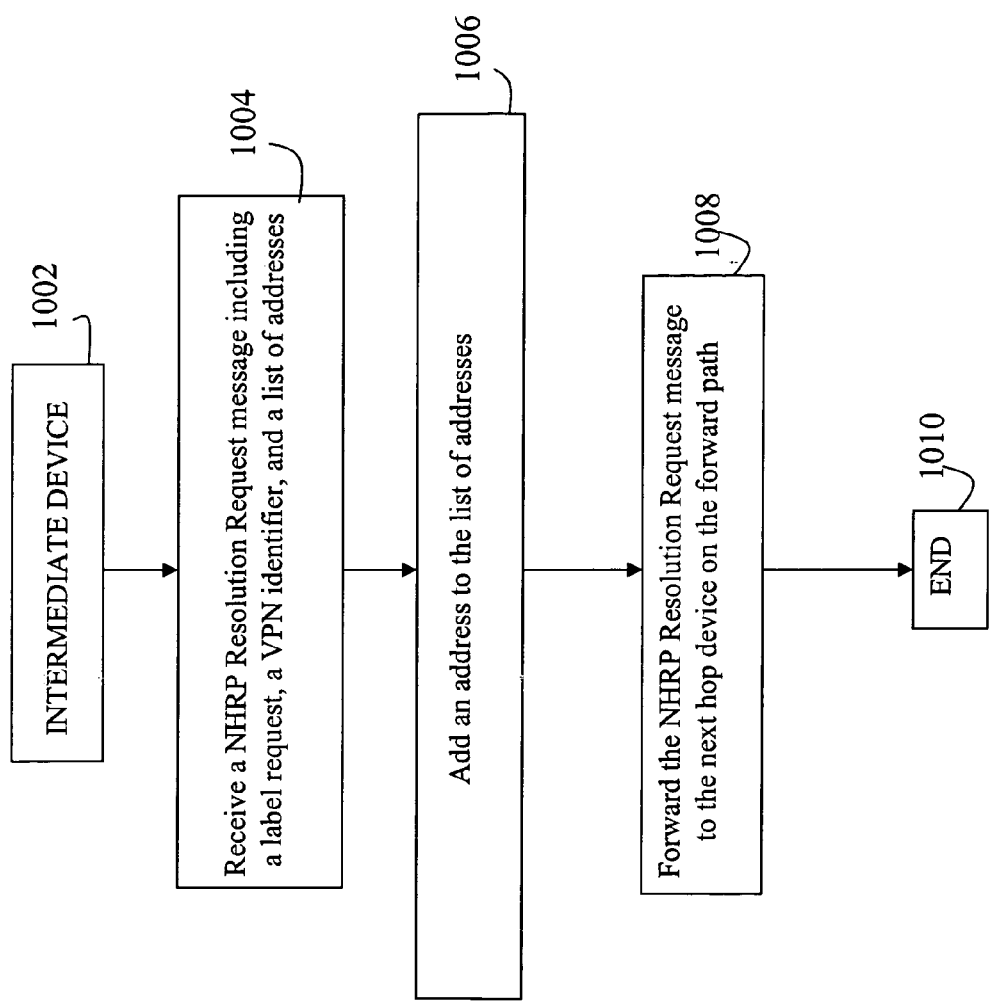

SYSTEM, DEVICE, AND METHOD FOR SUPPORTING VIRTUAL PRIVATE NETWORKS IN A LABEL SWITCHED COMMUNICATION NETWORK

CROSS-REFERENCE TO RELATED APPLICATION

The present invention claims priority under 35 U.S.C. §120 to the following commonly owned U.S. patent applications, which are hereby incorporated by reference in their entirety:

U.S. application Ser. No. 09/434,338 entitled SYSTEM, DEVICE AND METHOD FOR SUPPORTING VIRTUAL PRIVATE NETWORKS, which was filed on Nov. 4, 1999 which is a continuation of U.S. application Ser. No. 09/309,530 filed on May 11, 1999 in the names of James V. Luciani and Matthew Squire.

FIELD OF THE INVENTION

The present invention relates generally to communication systems, and more particularly to supporting virtual private networks in a multi-protocol label switching (MPLS) environment.

BACKGROUND OF THE INVENTION

In today's information age, communication devices, such as computers and computer peripherals, are often internetworked over a communication network. For various reasons, it is sometimes necessary or desirable for the communication network to be shared by multiple consumers. Because each of the consumers typically needs to maintain a certain amount of autonomy, the communication network is divided into a number of Virtual Private Networks (VPNs), where each VPN emulates a single, private network.

Various mechanisms for supporting VPNs in an MPLS environment are described in the IETF Internet Draft documents entitled VPN SUPPORT WITH MPLS [draft-heinanen-mpls-vpn-01.txt (March 1998)], MPLS VPN ARCHITECTURE [draft-jamieson-mpls-vpn-00.txt (August 1998)], IP VPN REALIZATION USING MPLS TUNNELS [draft-casey-vpn-mpls-00.txt (November 1998)], and CPE BASED VPNS USING MPLS [draft-li-mpls-vpn-00.txt], all of which are hereby incorporated by reference in their entireties.

SUMMARY OF THE INVENTION

In accordance with one aspect of the invention, a LSP is established for a VPN by including label information and a VPN identifier in NHRP messages and using the NHRP messages to establish the LSP for the VPN.

In order to establish a LSP for a forward path from an ingress device to an egress device, the ingress device sends a NHRP request message including a label request and the VPN identifier. The NHRP request message is forwarded hop-by-hop from the ingress device to the egress device by each intermediate device on the forward path. The egress device allocates a forward path label for a LSP segment from a previous hop device to the egress device, and sends a NHRP reply message including the forward path label and the VPN identifier. Each intermediate device on the forward path receives from the next hop device on the forward path a NHRP reply message including a forward path label for a LSP segment to the next hop device and the VPN identifier. Each intermediate device establishes a LSP to the next hop device using the forward path label from the NHRP reply message, allocates a forward path label for a LSP segment from the previous hop device on the forward path to the intermediate device, and sends a NHRP reply message including the forward path label and the VPN identifier. Upon receiving a NHRP reply message including a forward path label and the VPN identifier, the ingress device establishes a LSP to the next hop device on the forward path using the forward path label from the NHRP reply message.

In order to establish a LSP for a return path from an egress device to an ingress device, the ingress device sends a NHRP request message including a return path label for a LSP segment from a next hop device to the ingress device and the VPN identifier. Each intermediate device on the forward path receives from the previous hop device on the forward path a NHRP request message including a return path label and the VPN identifier. Each intermediate device establishes a LSP to the previous hop device using the return path label from the NHRP request message, allocates a return path label for a LSP segment from a next hop device to the intermediate device, and sends to the next hop device a NHRP request message including the return path label and the VPN identifier. Upon receiving a NHRP request message including a return path label and the VPN identifier, the egress device establishes a LSP to the previous hop device using the return path label from the NHRP request message.

In order to forward NHRP messages, each intermediate device that forwards the NHRP request message may maintain previous hop state information for the previous hop device, in which case the intermediate device forwards the NHRP reply message to the previous hop device based upon the previous hop state information. Alternatively, each intermediate device that forwards the NHRP request message may insert a device address into a forward path address list, in which case the intermediate device forwards the NHRP reply message to the previous hop device based upon a previous hop device address in a return path address list included in the NHRP reply message.

BRIEF DESCRIPTION OF THE DRAWINGS

The foregoing and other objects and advantages of the invention will be appreciated more fully from the following further description thereof with reference to the accompanying drawings wherein:

FIG. 9B is a logic flow diagram showing exemplary egress device logic for forcing the NHRP Resolution Reply messages to follow the forward path rather than the return path by maintaining previous hop information in accordance with an embodiment of the present invention;

FIG. 10A is a logic flow diagram showing exemplary intermediate device logic for forcing the NHRP Resolution Reply messages to follow the forward path rather than the return path using a list of addresses in accordance with an embodiment of the present invention;

DETAILED DESCRIPTION OF A PREFERRED EMBODIMENT

Figure 1:
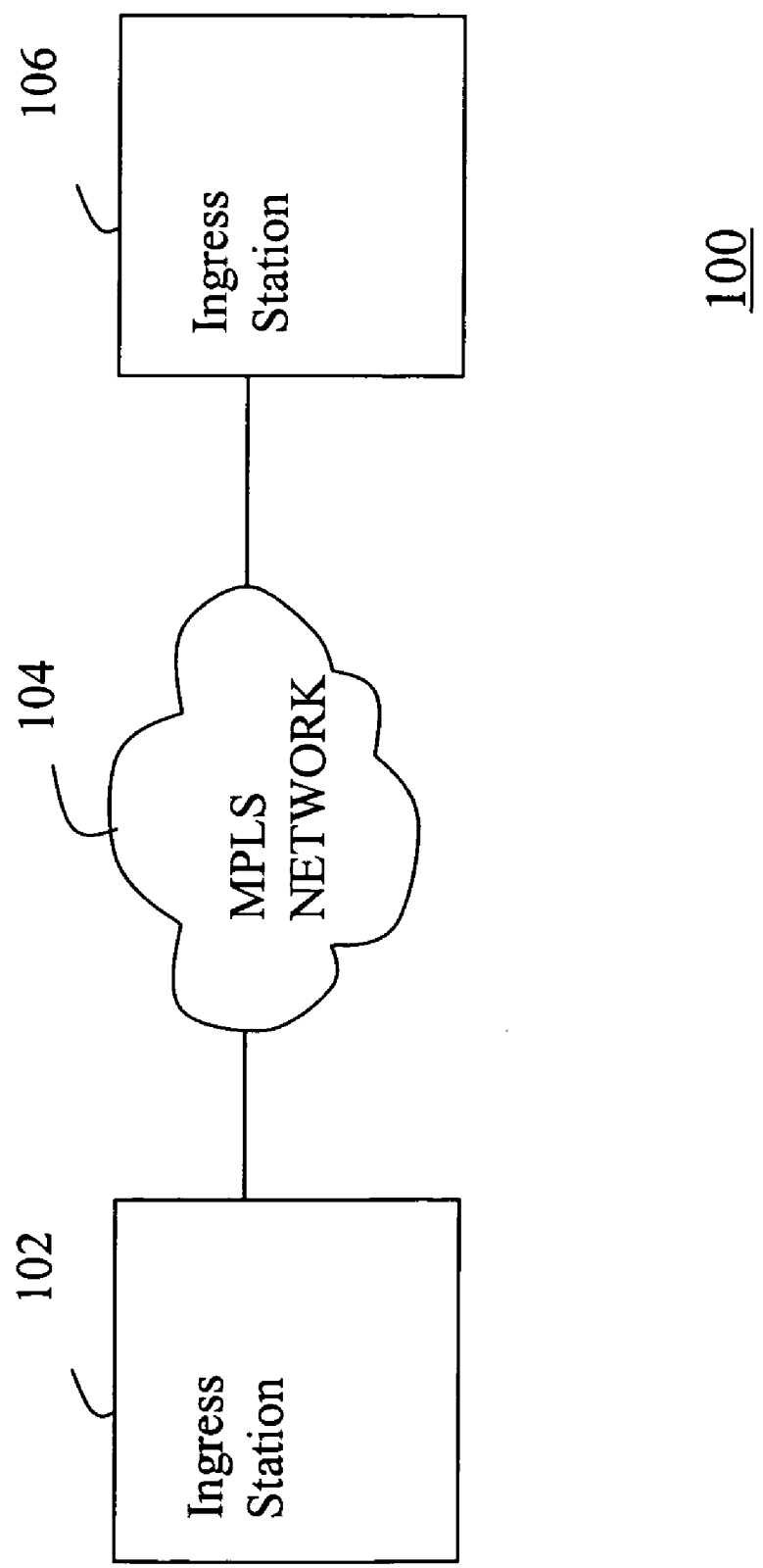
FIG. 1 is a block diagram showing an exemplary MPLS communication system including an Ingress Station in communication with an Egress Station via an MPLS Network.

A common networking model routes packets of information within the communication network using a networking protocol such as the Internet Protocol (IP) or other network layer protocol. Some networking protocols, such as IP, are considered to be "connectionless" networking protocols. In a connectionless networking protocol, each packet of information includes a network layer address, and each router forwards the packet of information based upon the network layer address according to a predetermined routing protocol such as the Open Shortest Path First (OSPF) protocol, the Routing Information Protocol (RIP), Hello, or other routing protocol.

Thus, each router makes an independent forwarding decision for the packet based upon the network layer address. Essentially, each router partitions the entire set of network layer addresses into a number of Forwarding Equivalence Classes (FECs), and each FEC is mapped to a particular outgoing path (or set of paths, in the case of multi-path routing) based upon the routing protocol. The router determines an FEC for each packet of information based upon the network layer address of the packet, and forwards the packet of information to the corresponding outgoing path (or set of paths).

Network layer routing requires each router to process each packet of information at the network layer. This is an expensive and time-consuming operation that limits the performance of some routers and even prevents certain devices that do not support the networking protocol from performing routing and other functions on the packets.

Label switching can be used to eliminate the network layer processing by certain devices in the communication network. Label switching enables a packet to be transported across a network domain (referred to hereinafter as an "autonomous system" or "AS") using labels rather than the network layer address. Specifically, a Label Switched Path (LSP) is established from an ingress point border device to an egress point border device in the AS. The LSP traverses a number of label switching devices. Each label switching device assigns a short, fixed-length value (i.e., a "label") to each FEC that it supports. When the packet enters the ingress point border device, the ingress point border device uses the network address to assign the packet to a particular FEC, and inserts the corresponding label into the packet, specifically within a packet header. Each subsequent label switching device along the LSP uses the label in the packet to determine the next hop FEC for the packet, and replaces the label in the packet with a new label corresponding to the next hop FEC for the packet. The egress point border device removes the label from the packet. Thus, only the ingress point border device processes the packet at the network layer, and subsequent devices process the packet based upon the label only.

The Internet Engineering Task Force (IETF) Multi-Protocol Label Switching (MPLS) working group has defined an MPLS architecture for utilizing label switching for internetworking. MPLS is considered to be "multi-protocol" because it can be used with any network layer protocol, and is not limited to IP. An MPLS framework is described in an IETF Internet Draft document entitled A FRAMEWORK FOR MULTIPROTOCOL LABEL SWITCHING [draft-ietf-mpls-framework-02.txt (November 1997)], and is hereby incorporated by reference in its entirety. The MPLS architecture is described in an IETF Internet Draft document entitled MULTIPROTOCOL LABEL SWITCHING ARCHITECTURE [draft-ietf-mpls-arch-05.txt (April 1999)], and is hereby incorporated by reference in its entirety.

In order to use label switching for internetworking, each label switching device must learn the labels that are used by its neighboring label switching device(s). Therefore, the IETF MPLS working group has defined a Label Distribution Protocol (LDP) for distributing labels between neighboring label switching devices. LDP is described in an IETF Internet Draft document entitled LDP SPECIFICATION [draft-ietf-mpls-ldp-04.txt (May 1999)], and is hereby incorporated by reference in its entirety. The use of LDP for label switching in an Asynchronous Transfer Mode (ATM) network is described in an IETF Internet Draft document entitled MPLS USING LDP AND ATM VC SWITCHING [draft-ietf-mpls-atm-02.txt (April 1999)], and is hereby incorporated by reference in its entirety.

Each label switching device maintains a label information base (LIB) for mapping each FEC to a corresponding label. When the label switching device receives a packet including a label, the label switching device utilizes the LIB to map the received label to a next hop FEC and to retrieve a label for the next hop FEC. The label switching device then replaces the label in the packet with the label for the next hop FEC, and forwards the resulting packet to the corresponding outgoing path (or set of paths).

For various reasons, it is sometimes necessary or desirable for the communication network to be shared by multiple consumers. Because each of the consumers typically needs to maintain a certain amount of autonomy, the communication network is divided into a number of Virtual Private Networks (VPNs), where each VPN emulates a single, private network.

Various mechanisms for supporting VPNs in an MPLS environment are described in the IETF Internet Draft documents entitled VPN SUPPORT WITH MPLS [draft-heinanen-mpls-vpn-01.txt (March 1998)], MPLS VPN ARCHITECTURE [draft-jamieson-mpls-vpn-00.txt (August 1998)], IP VPN REALIZATION USING MPLS TUNNELS [draft-casey-vpn-mpls-00.txt (November 1998)], and CPE BASED VPNS USING MPLS [draft-li-mpls-vpn-00.txt], all of which are hereby incorporated by reference in their entireties.

In an exemplary embodiment of the present invention, label switching is used to support VPNs in an MPLS environment by establishing a LSP for each VPN. Each station (host or router) maps each LSP to its respective VPN. Protocol messages that are associated with a particular VPN are carried over the corresponding LSP, specifically by inserting the appropriate label into the protocol messages and forwarding the protocol messages over the LSP.

Specifically, in a preferred embodiment of the present invention, the Next Hop Resolution Protocol (NHRP) is utilized for transporting MPLS label request and label mapping messages in order to support VPNs in an MPLS environment. NHRP is described in an IETF Request For Comments (RFC) document entitled NBMA NEXT HOP RESOLUTION PROTOCOL (NHRP) [RFC 2332 (April 1998)]. NHRP enables a source station (host or router) to determine the internetworking layer address and subnetwork addresses of a next hop station. NHRP can be used to support VPNs, for example, as described in the IETF Internet Draft entitled NHRP SUPPORT FOR VIRTUAL PRIVATE NETWORKS [draft-ietf-ion-nhrp-vpn-00.txt], which is hereby incorporated by reference in its entirety, and in the related application entitled SYSTEM, DEVICE, AND METHOD FOR SUPPORTING VIRTUAL PRIVATE NETWORKS, which was incorporated by reference above.

FIG. 1 shows an exemplary MPLS communication system 100 including an Ingress Station 102 in communication with an Egress Station 106 via an MPLS Network 104. The MPLS Network 104 includes a number of intermediate devices, such as switches and routers, that physically and logically interconnect the Ingress Station 102 and the Egress Station 106. In accordance with the present invention, a LSP is established for a particular VPN from the Ingress Station 102 to the Egress Station 106 across the MPLS Network 104, and particularly across a number of intermediate devices. NHRP is used to convey label information and a VPN identifier hop-by-hop between the Ingress Station 102 and the Egress Station 106, allowing the Ingress Station 102, the Egress Station 106, and the number of intermediate devices through which the Ingress Station 102 and the Egress Station 106 are interconnected to correlate the LSP with the particular VPN.

Figure 2:
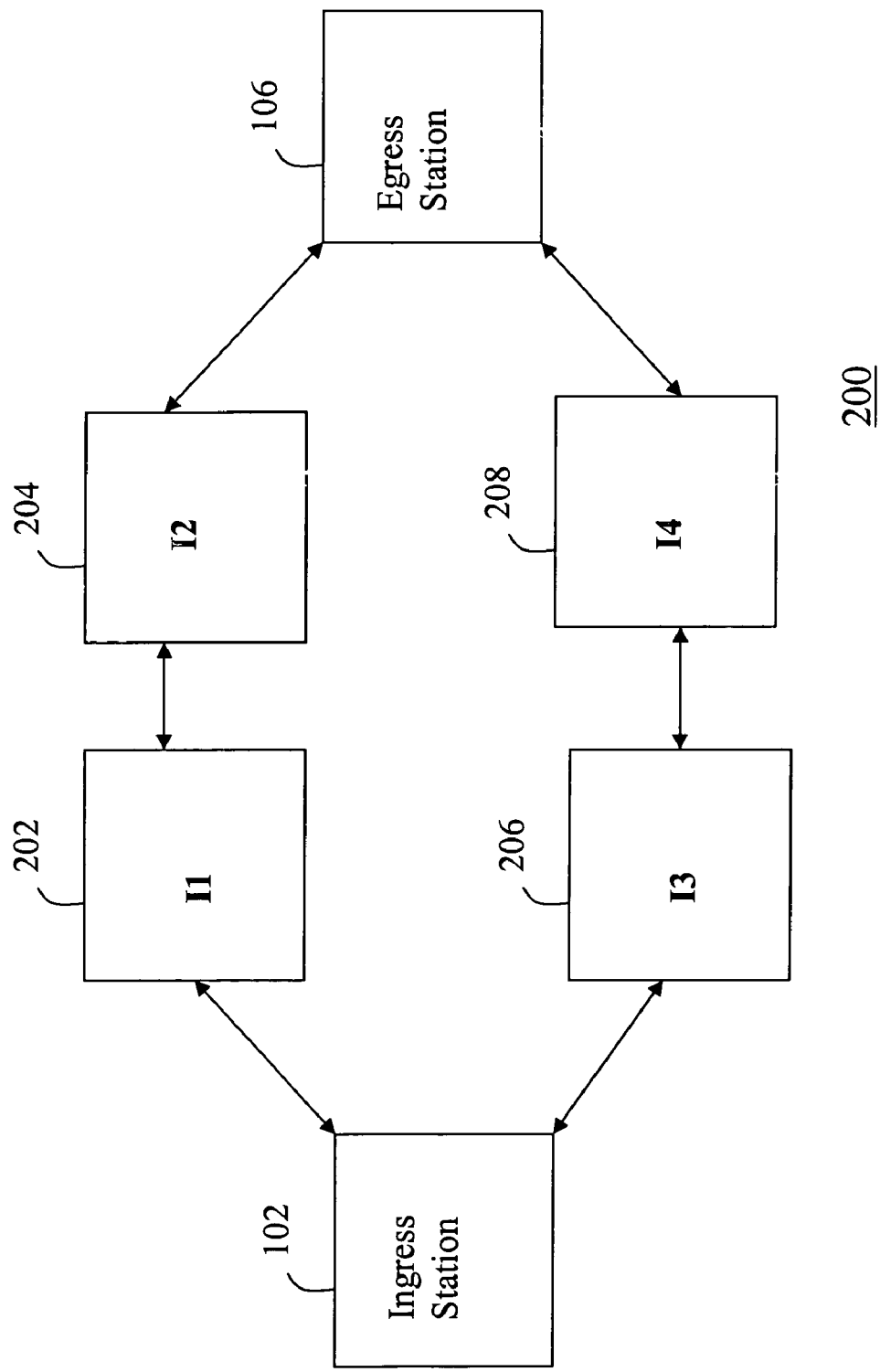
FIG. 2 is a block diagram showing an exemplary MPLS communication system in which the MPLS Network includes four (4) intermediate devices.

FIG. 2 shows an exemplary communication system 200 in which the MPLS Network 104 includes four (4) intermediate devices, namely the intermediate device I1 (202), the intermediate device I2 (204), the intermediate device I3 (206), and the intermediate device I4 (208). In the exemplary communication system 200 shown in FIG. 2, there are two paths between the Ingress Station 102 and the Egress Station 106, specifically one path that traverses the intermediate devices I1 (202) and I2 (204), and one path that traverses the intermediate devices I3 (206) and I4 (208).

When NHRP is used to obtain addressing information for establishing a connection, a NHRP Resolution Request message is forwarded hop-by-hop across a forward path from an ingress device to an egress device, and a NHRP Resolution Reply message including the addressing information is forwarded hop-by-hop across a return path from the egress device to the ingress device. The forward path and the return path may traverse the same or different intermediate devices.

Figure 3A:
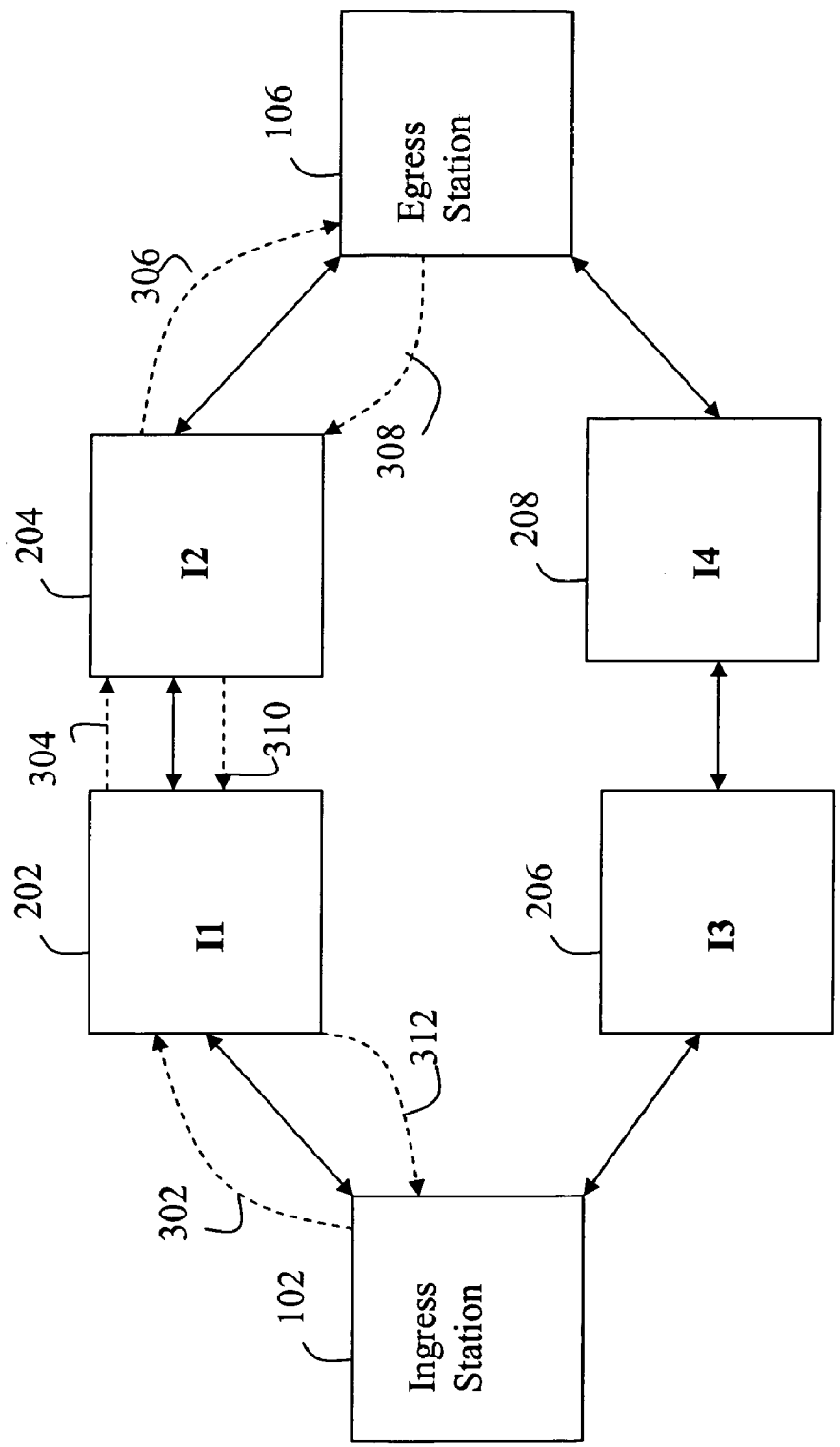
FIG. 3A is a block diagram showing an exemplary communication system where the forward path and the return path traverse the same intermediate devices.

FIG. 3A shows an exemplary communication system where the forward path and the return path traverse the same intermediate devices. Specifically, in the exemplary communication system shown in FIG. 3A, the forward path and the return path traverse the intermediate devices I1 (202) and I2 (204). The Ingress Station 102 sends a NHRP Resolution Request message 302 to the intermediate device I1 (202), which in turn sends a NHRP Resolution Request message 304 to the intermediate device I2 (204), which in turn sends a NHRP Resolution Request message 306 to the Egress Station 106. The Egress Station 106 sends a NHRP Resolution Reply message 308 to the intermediate device I2 (204), which in turn sends a NHRP Resolution Reply message 310 to the intermediate device I1 (202), which in turn sends a NHRP Resolution Reply message 312 to the Ingress Station 102.

Figure 3B:
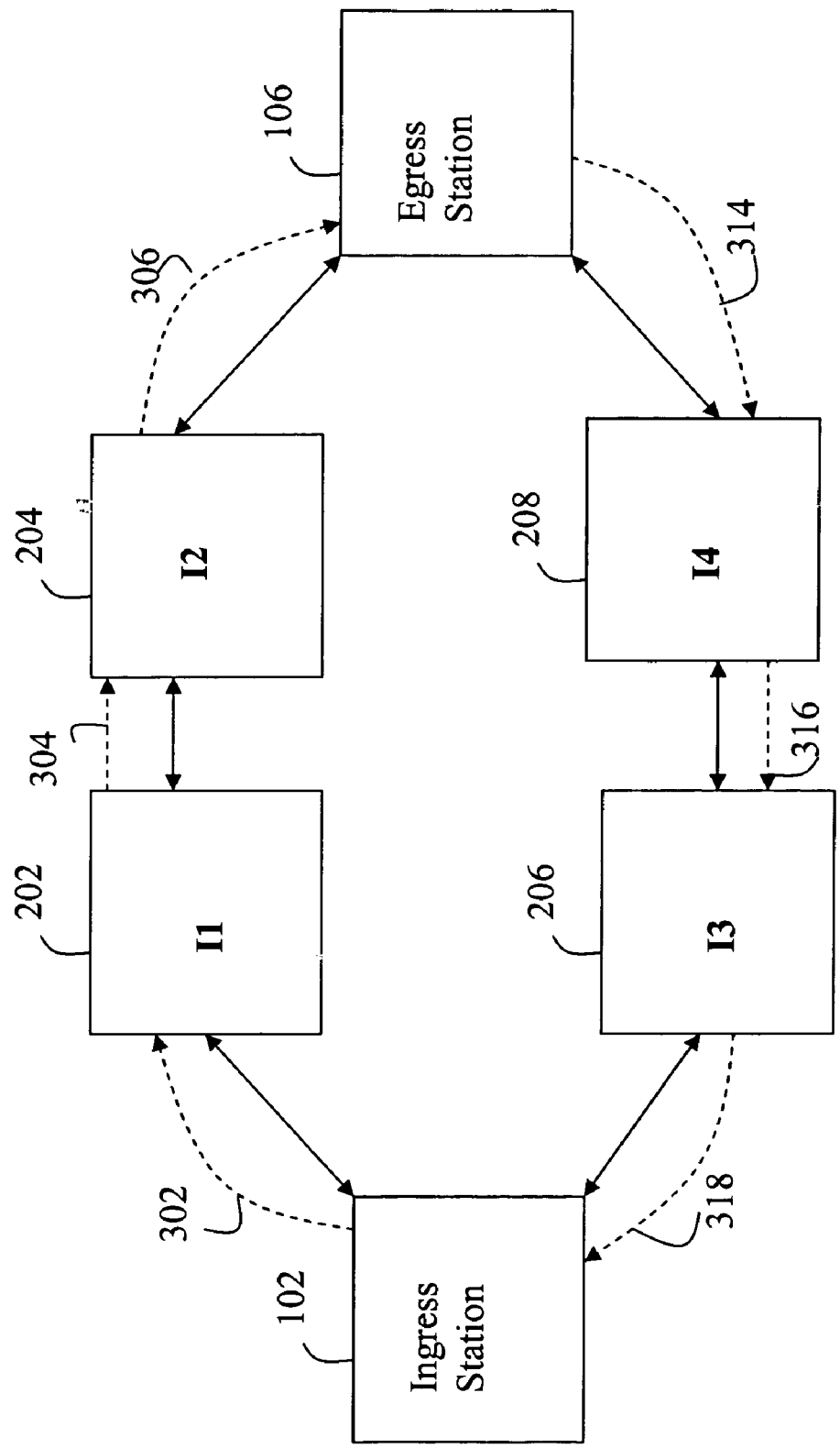
FIG. 3B is a block diagram showing an exemplary communication system where the forward path and the return path traverse different intermediate devices.

FIG. 3B shows an exemplary communication system where the forward path and the return path traverse different intermediate devices. Specifically, in the exemplary communication system shown in FIG. 3B, the forward path traverses the intermediate devices I1 (202) and I2 (204), while the return path traverses the intermediate devices I4 (208) and I3 (206). The Ingress Station 102 sends a NHRP Resolution Request message 302 to the intermediate device I1 (202), which in turn sends a NHRP Resolution Request message 304 to the intermediate device I2 (204), which in turn sends a NHRP Resolution Request message 306 to the Egress Station 106. The Egress Station 106 sends a NHRP Resolution Reply message 314 to the intermediate device I4 (208), which in turn sends a NHRP Resolution Reply message 316 to the intermediate deivce I3 (206), which in turn sends a NHRP Resolution Reply message 318 to the Ingress Station 102.

In order to establish a LSP for a particular VPN from an ingress device to an egress device, each device along the forward path from the ingress device to the egress device must "learn" a label for its next hop neighboring device and associate the label with the particular VPN. For example, with reference to FIG. 3A, in order to establish the LSP for the particular VPN from the Ingress Station 102 to the Egress Station 106, the Ingress Station 102 must "learn" a label for the intermediate device I1 (202), the intermediate device I1 (202) must "learn" a label for the intermediate device I2 (204), and the intermediate device I2 (204) must "learn" a label for the Egress Station 106. Therefore, in a preferred embodiment of the present invention, label information is conveyed in NHRP messages (often referred to as "piggybacking") along with a VPN identifier so that each device along the forward path can correlate the LSP with the particular VPN. Specifically, a label request is conveyed along with a VPN identifier in a NHRP Resolution Request message that is forwarded hop-by-hop along the forward path from the ingress device to the egress device. Label mapping information is conveyed along with a VPN identifier in NHRP reply messages that are forwarded hop-by-hop from the egress device to each device in the forward path and ultimately to the ingress device.

The related application entitled SYSTEM, DEVICE, AND METHOD FOR SUPPORTING VIRTUAL PRIVATE NETWORKS, which was incorporated by reference above, describes a VPN Identifier (VPN-ID) Type-Length-Value (TLV) field that may be encoded into certain NHRP messages, specifically NHRP Resolution Request and Resolution Reply messages. The VPN-ID TLV field includes, among other things, a VPN identifier identifying the VPN. By including the VPN identifier in the NHRP Resolution Request and Resolution Reply messages, the ingress and egress stations are able to associate a particular Virtual Channel Connection (VCC) with a particular VPN, as indicated by the VPN identifier in the NHRP message.

Figure 4:
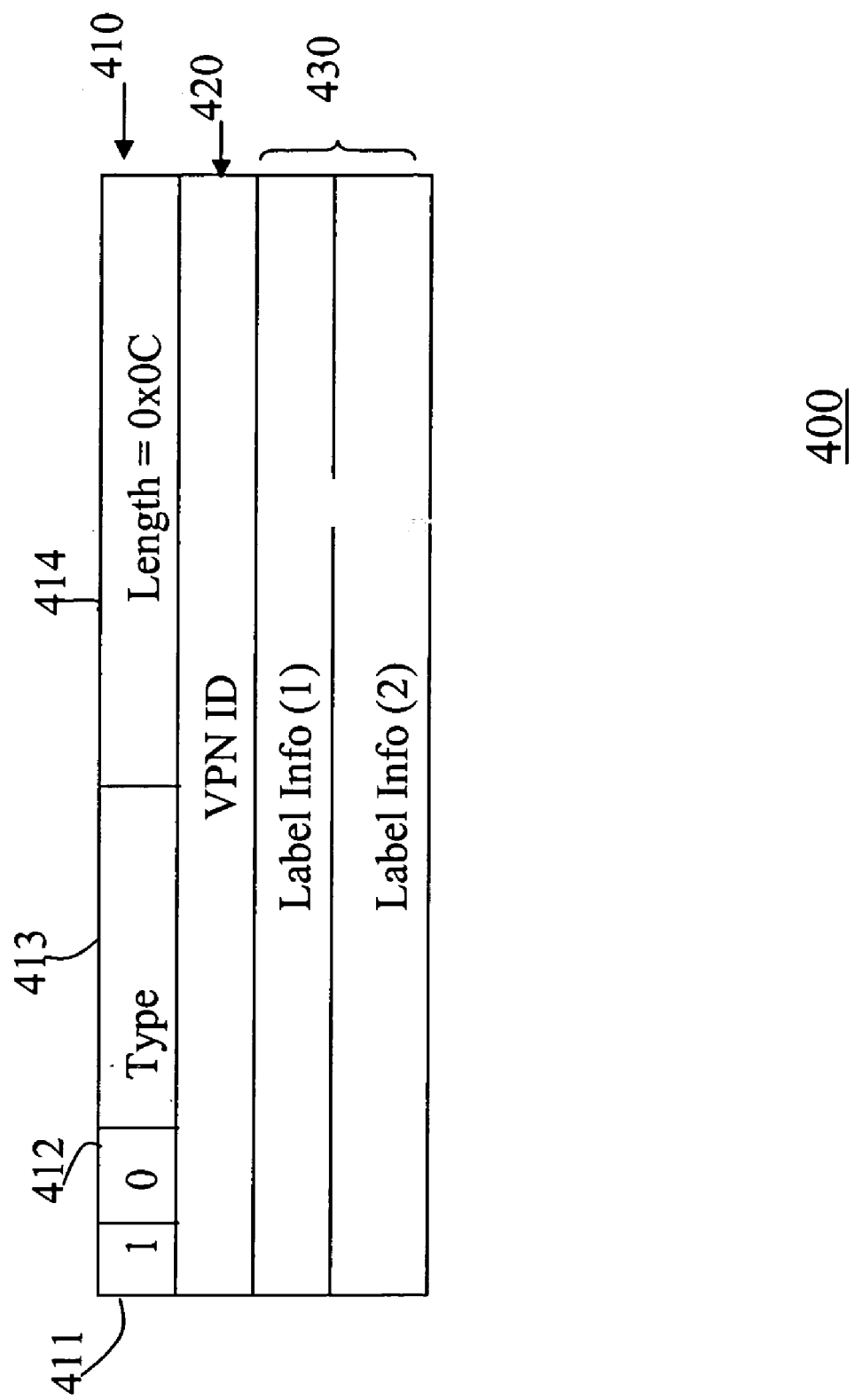
FIG. 4 is a block diagram showing the format of an exemplary VPN-ID TLV field in accordance with an embodiment of the present invention.

In a preferred embodiment of the present invention, the VPN-ID TLV field is extended to include label information in addition to the VPN identifier. FIG. 4 shows the format of an exemplary VPN-ID TLV field 400 including both a VPN identifier and label information. As shown in FIG. 4, the preferred VPN-ID TLV field 400 includes a header field 410, a VPN-ID field 420, and a Label Information field 430. The header field 410 includes a Compulsory field 411, an unused field 412, a Type field 413, and Length field 414. In a preferred embodiment of the present invention, the VPN-ID TLV field 400 is considered be "compulsory" as that term is used with reference to TLV extensions in the IETF RFC document entitled NBMA NEXT HOP RESOLUTION PROTOCOL (NHRP), which was incorporated by reference above, and therefore the Compulsory field 411 is always set to the value one (1). The Length field 414 indicates the length of the VPN-ID TLV field 400, which is preferably equal to twelve (12) bytes (0×0C in hexadecimal). The Type field 413 for the VPN-ID TLV field 400 is not yet assigned. The Label Information 430 field may contain label request information (in the case of a NHRP Resolution Request or other request message) or label mapping information (in the case of a NHRP reply message), as described in detail below. By including both the VPN identifier and the label information in the NHRP messages, each station and intermediate device is able to associate a particular LSP, as indicated by the label information in the NHRP message, with a particular VPN, as indicated by the VPN identifier in the NHRP message.

In various embodiments of the present invention, the ingress device sends a label request along with a VPN identifier to the egress device by including the label request and VPN identifier in a NHRP Resolution Request message. Specifically, the ingress device sends a NHRP Resolution Request message with a VPN-ID TLV field 400 including the label request and VPN identifier in the Label Information field 430 and VPN-ID field 420, respectively. Each device along the forward path transfers the VPN-ID TLV field 400 in a NHRP Resolution Request message that is forwarded to the next hop device.

Figure 5:
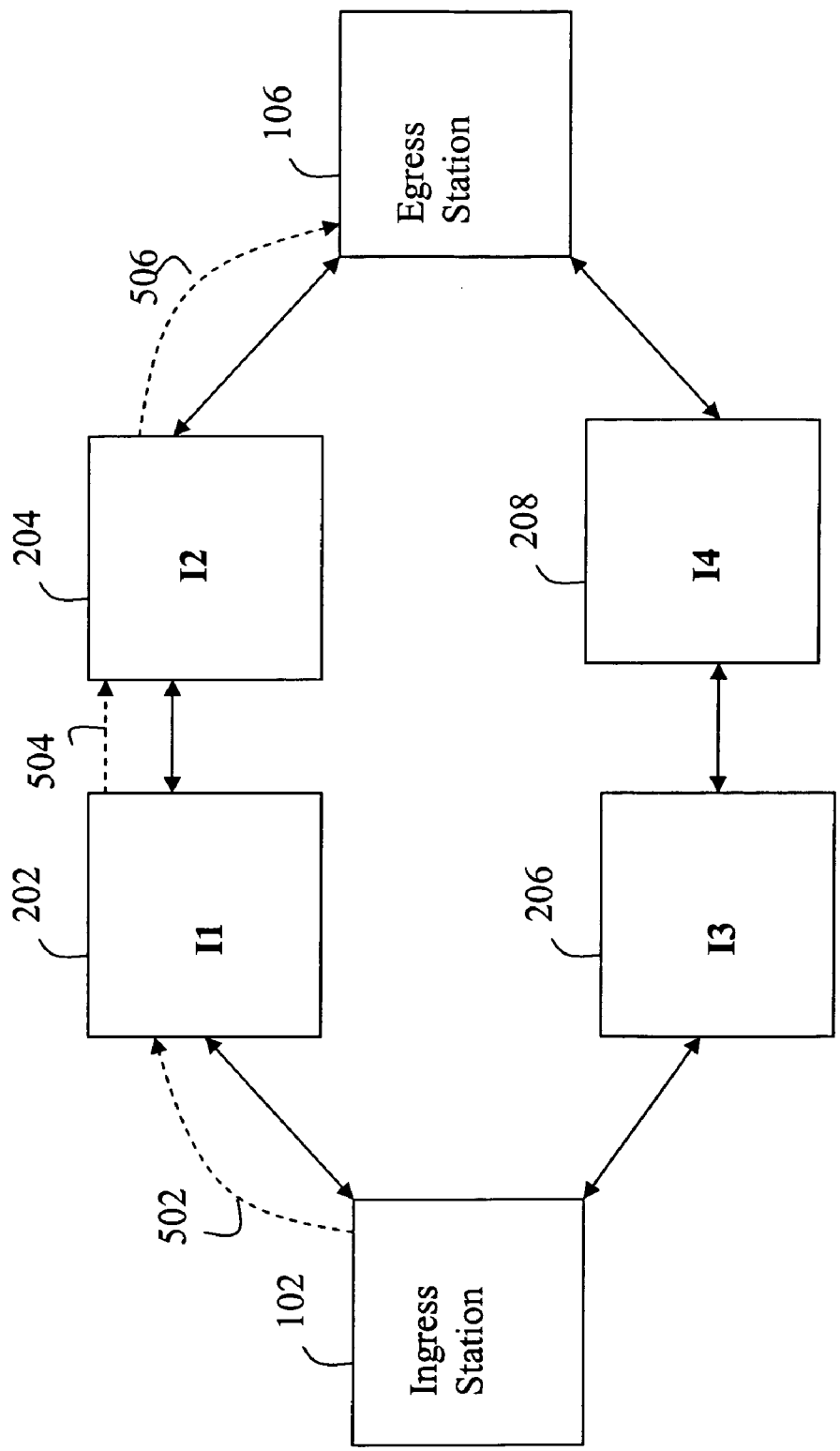
FIG. 5 is a block diagram showing an exemplary communication system in which a label request is included along with a VPN identifier in the NHRP Resolution Request message in accordance with an embodiment of the present invention.

FIG. 5 shows an exemplary communication system in which the label request is included along with a VPN identifier in the NHRP Resolution Request message. As shown in FIG. 5, the Ingress Station 102 sends to the intermediate device I1 (202) a NHRP Resolution Request message 502 with a VPN-ID TLV field 400 including the label request in the Label Information field 430. The intermediate device I1 (202) in turn sends to the intermediate device I2 (204) a NHRP Resolution Request message 504 with the VPN-ID TLV field 400 from the NHRP Resolution Request message 502. The intermediate device I2 (204) in turn sends to the Egress Station 106 a NHRP Resolution Request message 506 with the VPN-ID TLV field 400 from the NHRP Resolution Request message 504.

As discussed above, each device along the forward path from the ingress device to the egress device "learns" a label for its next hop neighboring device from label mapping information that is conveyed along with a VPN identifier in NHRP reply messages that are forwarded hop-by-hop from the egress device to each device in the forward path and ultimately to the ingress device.

A first exemplary embodiment of the present invention enables each device along the forward path to "learn" a label for its next hop neighboring device when the forward path and the return path traverse the same intermediate devices. Because the forward path and the return path traverse the same intermediate devices, message flows are described relative to the forward path for the sake of clarity. Thus, when sending a message to a neighboring device on the return path, a particular device is said to send a message to the previous hop device on the forward path rather than to the next hop device on the return path.

In this first exemplary embodiment of the present invention, the label mapping information may be included along with a VPN identifier in NHRP Resolution Reply messages that are forwarded hop-by-hop across the return path. In this case, upon receiving the NHRP Resolution Request message including the label request and the VPN identifier, the egress device allocates a label for the previous hop on the forward path and sends to the previous hop device on the forward path a NHRP Resolution Reply message with a VPN-ID TLV field 400 including the label for the previous hop on the forward path and the VPN identifier, specifically within the Label Information field 430 and VPN-ID field 420 of the VPN-ID TLV field 400, respectively. Upon receiving the NHRP Resolution Reply message from its next hop device on the forward path, each device along the return path extracts from the NHRP Resolution Reply message the label associated with the next hop on the forward path and the VPN identifier, specifically from the Label Information field 430 and VPN-ID field 420 of the VPN-ID TLV field 400, respectively. Each device along the return path allocates a label for the previous hop on the forward path, and sends to the previous hop device on the forward path a NHRP Resolution Reply message with a VPN-ID TLV field 400 including the label for the previous hop on the forward path and the VPN identifier, specifically in the Label Information field 430 and VPN-ID field 420 of the VPN-ID TLV field 400, respectively. Each device along the return path creates the appropriate LIB entries in order to map the labels associated with the LSP to the particular VPN indicated by the VPN identifier.

Figure 6:
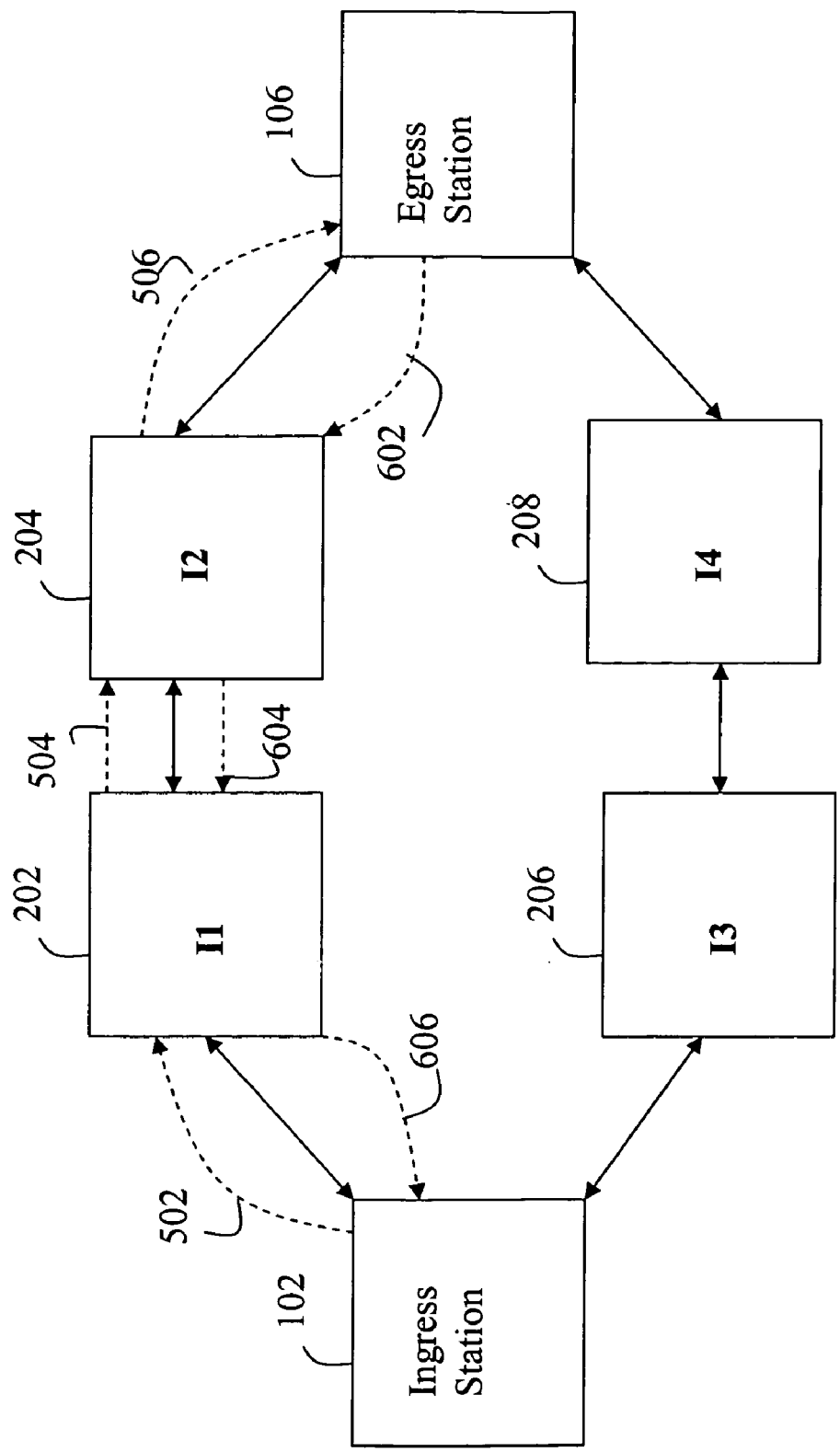
FIG. 6 is a block diagram showing an exemplary communication system in which the label mappings and VPN identifier are conveyed in NHRP Resolution Reply messages that are forwarded hop-by-hop along the return path in accordance with an embodiment of the present invention.

FIG. 6 shows an exemplary communication system in which the label mappings and VPN identifier are conveyed in NHRP Resolution Reply messages that are forwarded hop-by-hop along the return path. Upon receiving the NHRP Resolution Request message 506 including the VPN ID TLV field 400 including the label request and the VPN identifier, the Egress Station 106 allocates a label for the LSP segment from the intermediate device I2 (204), and sends to the intermediate device I2 (204) over the return path a NHRP Resolution Reply message 602 with a VPN-ID TLV field 400 including the label and the VPN identifier, specifically in the Label Information field 430 and the VPN-ID field 420 of the VPN-ID TLV field 400, respectively. Upon receiving the NHRP Resolution Reply message 602, the intermediate device I2 (204) allocates a label for the LSP segment from the intermediate device I1 (202), and sends to the intermediate device I1 (202) over the return path a NHRP Resolution Reply message 604 with a VPN-ID TLV field 400 including the label and the VPN identifier, specifically in the Label Information field 430 and the VPN-ID field 420 of the VPN-ID TLV field 400, respectively. Upon receiving the NHRP Resolution Reply message 604, the intermediate device I1 (202) allocates a label for the LSP segment from the Ingress Station 102, and sends to the Ingress Station 102 over the return path a NHRP Resolution Reply message 606 with a VPN-ID TLV field 400 including the label and the VPN identifier, specifically in the Label Information field 430 and the VPN-ID field 420 of the VPN-ID TLV field 400, respectively.

Unfortunately, as discussed above, the forward path and the return path may traverse different intermediate devices. In this case, the label mapping information cannot simply be included along with a VPN identifier in NHRP Resolution Reply messages that are forwarded hop-by-hop across the return path, since such label mapping information will not be received by the devices along the forward path as required to establish the LSP for the VPN.

Therefore, in a second exemplary embodiment of the present invention, a new NHRP Label Mapping message is used to convey label mapping information to the devices along the forward path, while NHRP Resolution Reply messages are forwarded hop-by-hop across the return path as usual. Specifically, when a device along the forward path receives a NHRP Resolution Request message with a VPN-ID TLV field 400 including a label request and a VPN identifier, the device forwards the NHRP Resolution. Request message (in the case of an intermediate device) or sends a NHRP Resolution Reply message (in the case of the egress device). The device also allocates a label for the previous hop of the forward path, and sends to the previous hop device on the forward path a NHRP Label Mapping message including the label and the VPN identifier. Each device along the forward path creates the appropriate LIB entries in order to map the labels associated with the LSP to the particular VPN indicated by the VPN identifier.

Figure 7:
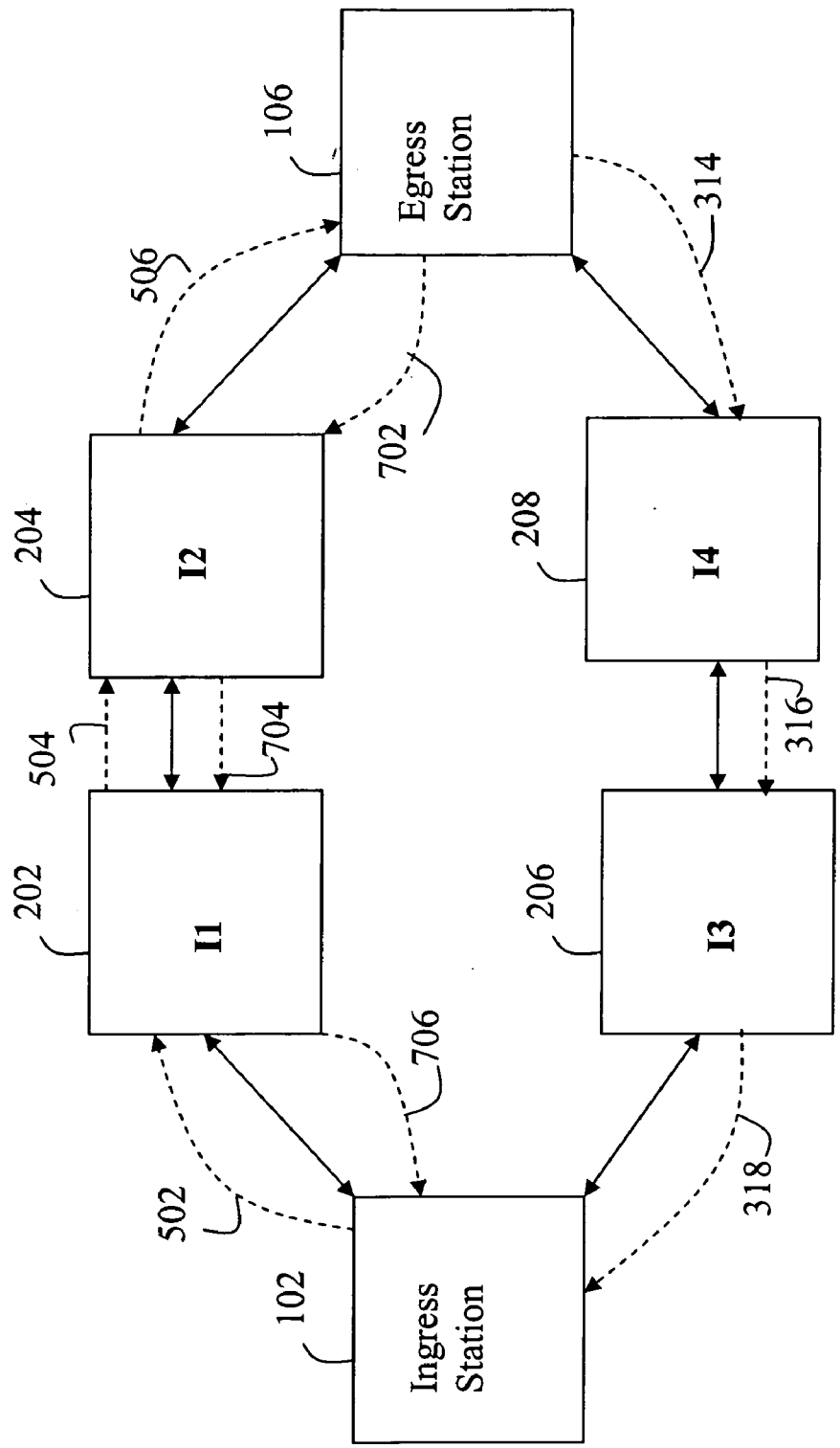
FIG. 7 is a block diagram showing an exemplary communication system in which NHRP Label Mapping messages are used to convey label mapping information and the VPN identifier to the devices along the forward path in accordance with an embodiment of the present invention.

FIG. 7 shows an exemplary communication system in which a NHRP Label Mapping message is used to convey label mapping information to the devices along the forward path from the ingress device and the egress device. As shown in FIG. 7, the Ingress Station 102 sends to the intermediate device I1 (202) a NHRP Resolution Request message 502 with a VPN-ID TLV field 400 including the label request in the Label Information field 430. Upon receiving the NHRP Resolution Request message 502, the intermediate device I1 (202) sends to the intermediate device I2 (204) a NHRP Resolution Request message 504 with the VPN-ID TLV field 400 from the NHRP Resolution Request message 502. The intermediate device I1 (202) also allocates a label for the LSP segment from the Ingress Station 102, and sends to the Ingress Station 102 a NHRP Label Mapping message 706 including the label and the VPN identifier. Upon receiving the NHRP Resolution Request message 504, the intermediate device I2 (204) sends to the Egress Station 106 a NHRP Resolution Request message 506 with the VPN-ID TLV field 400 from the NHRP Resolution Request message 504. The intermediate device I2 (204) also allocates a label for the LSP segment from the intermediate device I1 (202), and sends to the intermediate device I1 (202) a NHRP Label Mapping message 704 including the label and the VPN identifier. Upon receiving the NHRP Resolution Request message 506, the Egress Station 106 sends to the intermediate device I4 (208) a NHRP Resolution Reply message 314. The Egress Station 106 also allocates a label for the LSP segment from the intermediate device I2 (204), and sends to the intermediate device I2 (204) a NHRP Label Mapping message 702 including the label and the VPN identifier. Upon receiving the NHRP Resolution Reply message 314, the intermediate device I4 (208) sends a NHRP Resolution Reply message 316 to the intermediate device I3 (206), which in turn sends a NHRP Resolution Reply message 318 to the Ingress Station 102. Based upon the label mapping information included in the NHRP Label Mapping messages 702, 704, and 706, the Ingress Station 102, the intermediate devices I1 (202) and I2 (204), and the Egress Station 106 create the appropriate LIB entries to map the LSP to the VPN.

It should be noted that, in this second exemplary embodiment of the present invention, the devices along the forward path may create the LSP for the VPN before the NHRP resolution procedure is complete. Thus, the LSP may be created even if the NHRP resolution procedure ultimately fails. In order to handle such a contingency, the ingress device preferably includes "clean-up" logic that deletes the LSP if the NHRP resolution procedure does not successfully complete within a predetermined period of time.

Figure 8:
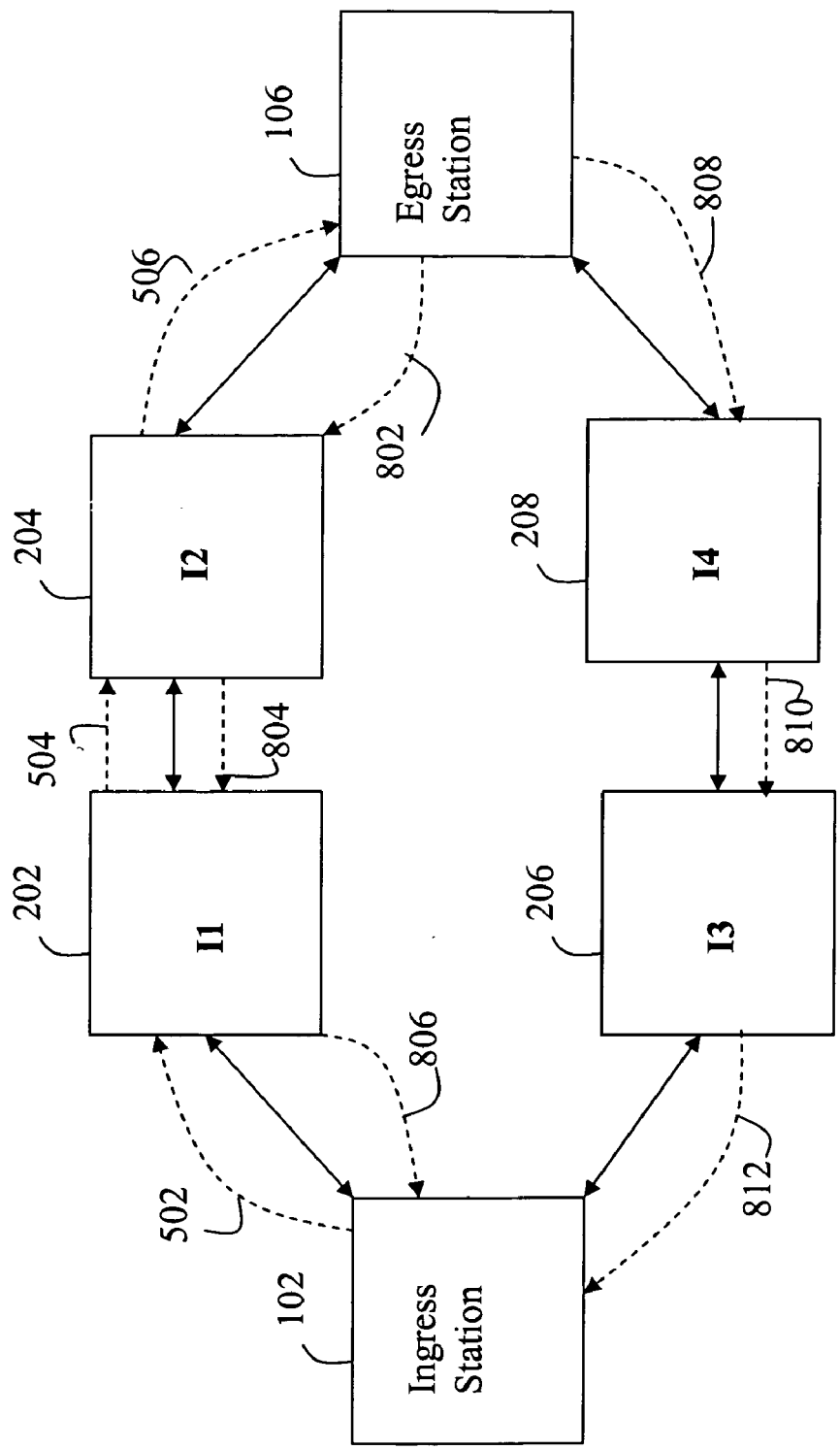
FIG. 8 is a block diagram showing an exemplary communication system in which NHRP Resolution Reply messages are used to convey label mapping information and the VPN identifier to the devices along the forward path in accordance with an embodiment of the present invention.

In a third exemplary embodiment of the present invention, the label mapping information is included along with a VPN identifier in NHRP Resolution Reply messages, as in the first exemplary embodiment described above with reference to FIG. 6, but the NHRP Resolution Reply messages are forced to follow the forward path rather than the return path. FIG. 8 shows an exemplary communication system in which the NHRP Resolution Reply messages are forced to follow the forward path rather than the return path. As shown in FIG. 8, the return path from the Egress Station 106 to the Ingress Station 102 traverses hops 808, 810, and 812. However, the NHRP Resolution Reply messages traverse hops 802, 804, and 806.

One way to force the NHRP Resolution Reply messages to follow the forward path rather than the return path is for each device along the forward path to maintain state information relating to the previous hop device on the forward path and route the NHRP Resolution Reply messages according to the previous hop state information. Specifically, when an intermediate device along the forward path receives a NHRP Resolution Request message including the label request and the VPN identifier, the intermediate device maintains the previous hop state information including, among other things, a route to the previous hop device on the forward path and the VPN identifier. When the egress device receives a NHRP Resolution Request message including the label request and the VPN identifier, the egress device allocates a label for the previous hop LSP segment on the forward path, and sends to the previous hop device on the forward path a NHRP Resolution Reply message including the label and the VPN identifier. When an intermediate device receives a NHRP Resolution Reply message including label mapping information and the VPN identifier, the intermediate device allocates a label for the previous hop LSP segment on the forward path, and, using the previous hop state information, sends to the previous hop device on the forward path a NHRP Resolution Reply message including the label and the VPN identifier. Because the intermediate devices along the forward path may maintain previous hop state information for multiple VPNs at any given time, the VPN identifier in the NHRP Resolution Reply message allows each device along the forward path to match the NHRP Resolution Reply message to the correct previous hop state information for the VPN.

Figure 9A:
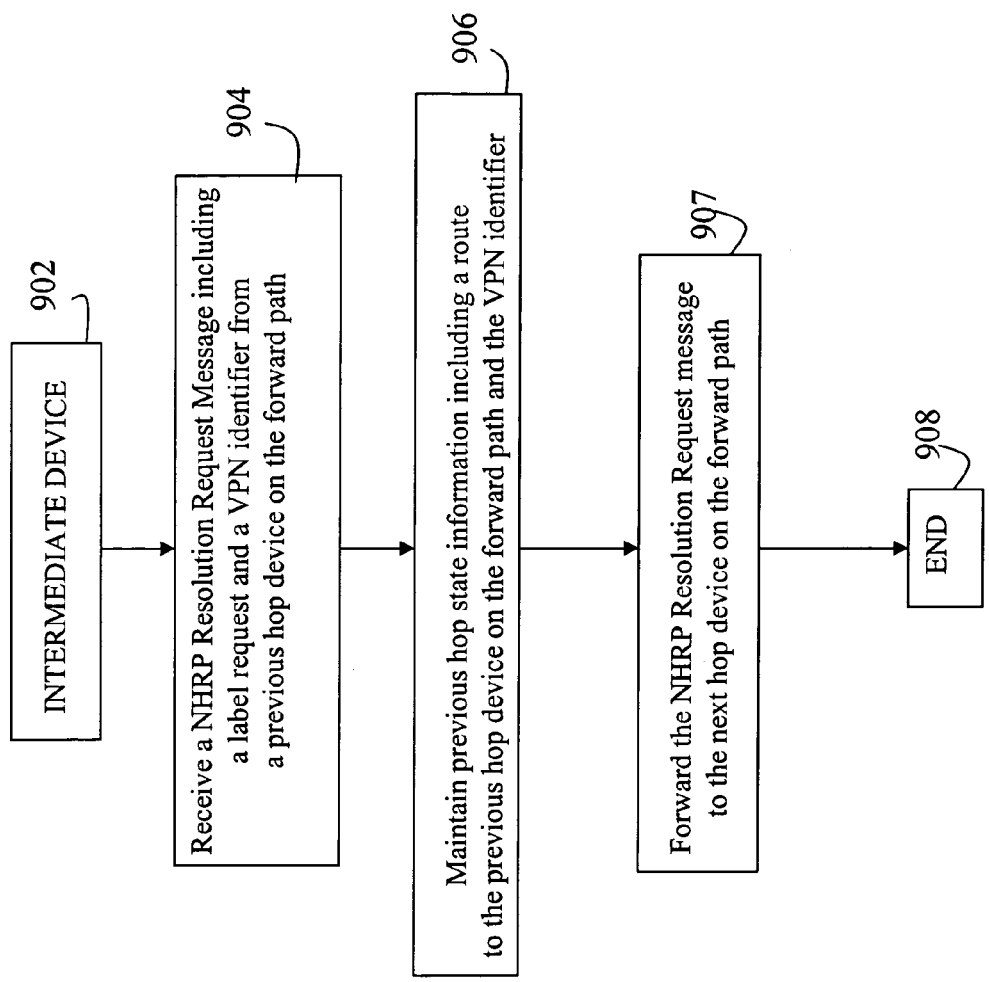
FIG. 9A is a logic flow diagram showing exemplary intermediate device logic for forcing the NHRP Resolution Reply messages to follow the forward path rather than the return path by maintaining previous hop information in accordance with an embodiment of the present invention.
Figure 9C:
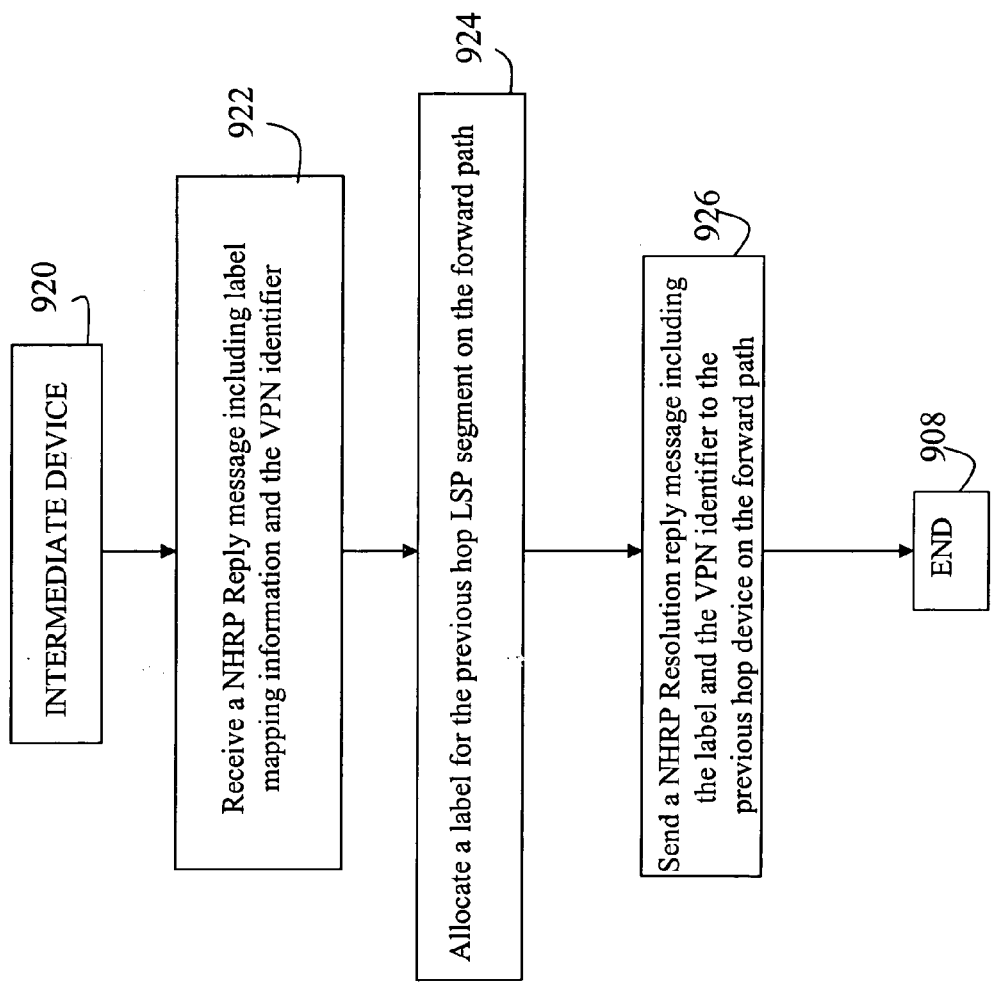
FIG. 9C is a logic flow diagram showing exemplary intermediate device logic for forcing the NHRP Resolution Reply messages to follow the forward path rather than the return path by maintaining previous hop information in accordance with an embodiment of the present invention.

FIGS. 9A, 9B, and 9C are logic flow diagrams showing exemplary intermediate device logic and egress device logic for forcing the NHRP Resolution Reply messages to follow the forward path rather than the return path by maintaining previous hop state information. As shown in FIG. 9A beginning at step 902, upon receiving a NHRP Resolution Request message including a label request and a VPN identifier from a previous hop device on the forward path, in step 904, an intermediate device maintains previous hop state information including a route to the previous hop device on the forward path and the VPN identifier, in step 906, forwards the NHRP Resolution Request message to the next hop device on the forward path, in step 907, and terminates in step 908. As shown in FIG. 9B beginning at step 910, upon receiving a NHRP Resolution Request message including a label request and a VPN identifier from a previous hop device on the forwarding path, in step 912, the egress device allocates a label for the previous hop LSP segment on the forward path, in step 914, sends to the previous hop device on the forward path a NHRP Resolution Reply message including the label and the VPN identifier, in step 916, and terminates in step 918. As shown in FIG. 9C beginning at step 920, upon receiving a NHRP Resolution Reply message including label mapping information and the VPN identifier, in step 922, an intermediate device allocates a label for the previous hop LSP segment on the forward path, in step 924, sends to the previous hop device on the forward path a NHRP Resolution Reply message including the label and the VPN identifier, in step 926, and terminates in step 928.

Another way to force the NHRP Resolution Reply messages to follow the forward path rather than the return path is for each device along the forward path to add its address to a list of addresses in the NHRP Resolution Request messages forwarded along the forward path, preferably by adding a NHRP Forward Transit NHS Record Extension field to the NHRP Resolution Request message, and route the NHRP Resolution Reply messages back across the forward path by routing the NHRP Resolution Reply messages to the addresses in the list of addresses in reverse order. The NHRP Forward Transit NHS Record Extension field and its uses are described in the IETF RFC document entitled NBMA NEXT HOP RESOLUTION PROTOCOL (NHRP), which was incorporated by reference above. Each device along the forward path (except the egress device) adds a NHRP Forward Transit NHS Record Extension field to the NHRP Resolution Request message such that, when the NHRP Resolution Request message reaches the egress device, the NHRP Resolution Request message includes the routing address of each device along the forward path. Upon receiving the NHRP Resolution Request message including the list of addresses, the egress device allocates a label for the previous hop LSP segment on the forward path, and forwards to the previous hop device on the forward path a NHRP Resolution Reply message including at least the label, the VPN identifier, and the list of addresses for at least those devices to which the NHRP Resolution Reply message must be forwarded, specifically by routing the NHRP Resolution Reply message to the last address in the list of addresses. Upon receiving a NHRP Resolution Reply message including label mapping information, the VPN identifier, and a list of remaining addresses, an intermediate device allocates a label for the previous hop LSP segment on the forward path, and sends to the previous hop device on the forward path a NHRP Resolution Reply message including at least the label, the VPN identifier, and the list of addresses for at least those devices to which the NHRP Resolution Reply message must be forwarded, specifically by routing the NHRP Resolution Reply message to the last address in the list of remaining addresses.

Figure 10B:
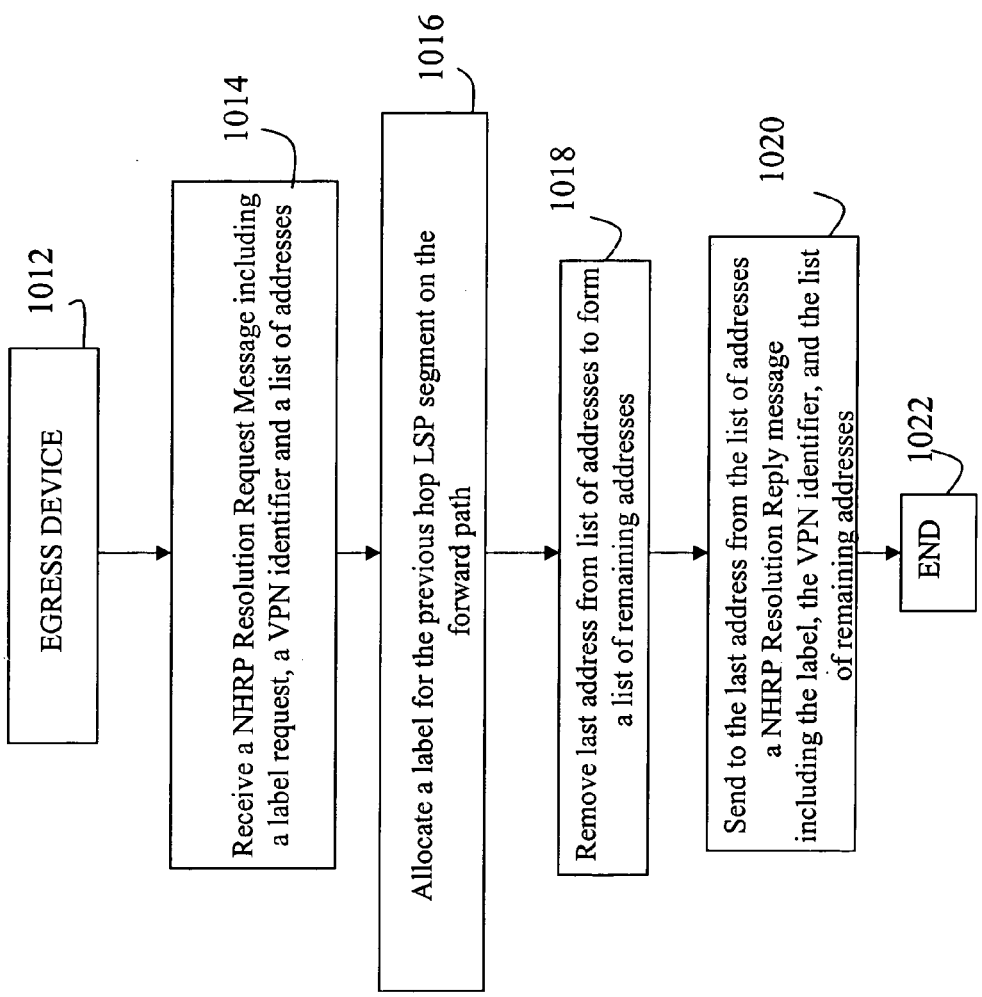
FIG. 10B is a logic flow diagram showing exemplary egress device logic for forcing the NHRP Resolution Reply messages to follow the forward path rather than the return path using a list of addresses in accordance with an embodiment of the present invention.
Figure 10C:
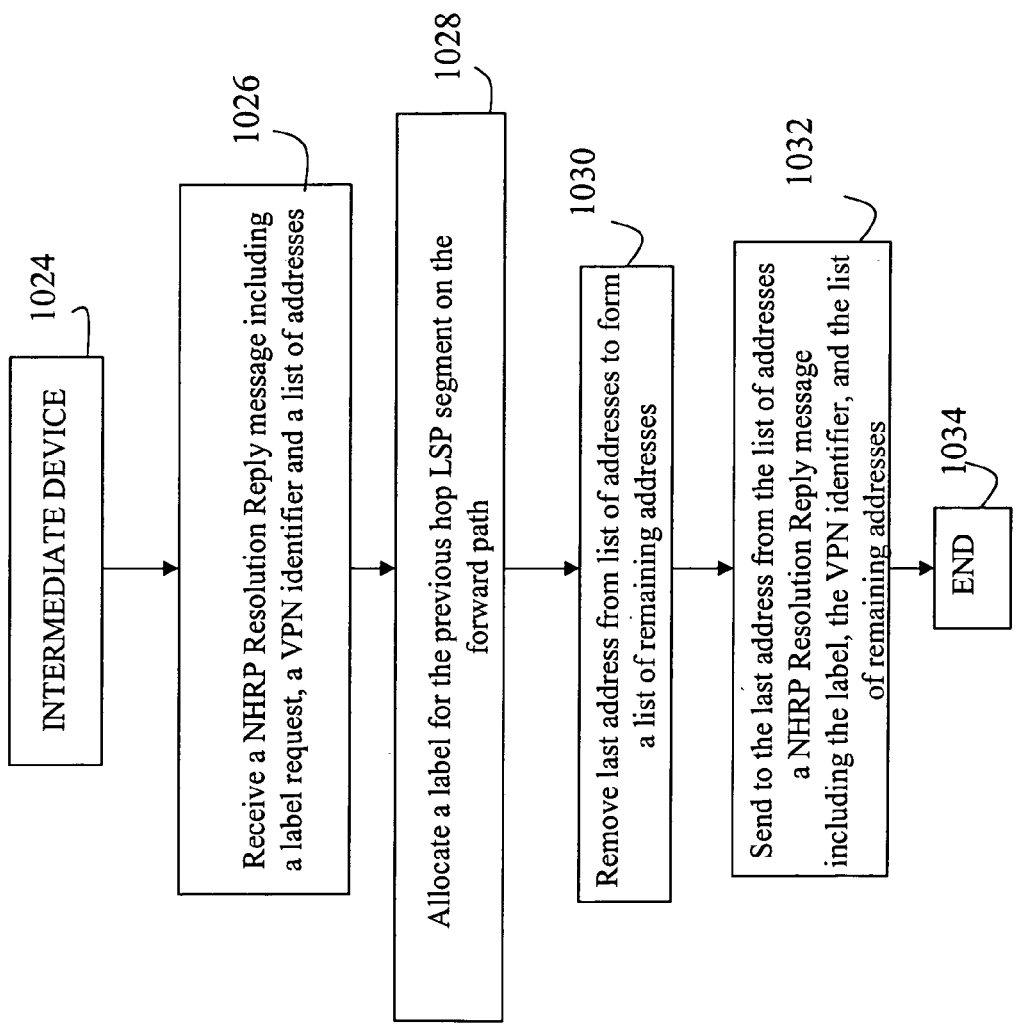
FIG. 10C is a logic flow diagram showing exemplary intermediate device logic for forcing the NHRP Resolution Reply messages to follow the forward path rather than the return path using a list of addresses in accordance with an embodiment of the present invention.

FIGS. 10A, 10B, and 10C are logic flow diagrams showing exemplary intermediate device logic and egress device logic for forcing the NHRP Resolution Reply messages to follow the forward path rather than the return path using a list of addresses. As shown in FIG. 10A beginning at step 1002, upon receiving a NHRP Resolution Request message including a label request, a VPN identifier, and a list of addresses, in step 1004, an intermediate device adds its address to the list of addresses, in step 1006, forwards the NHRP Resolution Request message to the next hop device on the forward path, in step 1008, and terminates in step 1010. As shown in FIG. 10B beginning at step 1012, upon receiving a NHRP Resolution Request message including a label request, a VPN identifier, and a list of addresses, in step 1014, the egress device allocates a label for the previous hop LSP segment on the forward path, in step 1016, removes the last address from the list of addresses to form a list of remaining addresses, in step 1018, sends to the last address from the list of addresses a NHRP Resolution Reply message including the label, the VPN identifier, and the list of remaining addresses, in step 1020, and terminates in step 1022. As shown in FIG. 10C beginning at step 1024, upon receiving a NHRP Resolution Reply message including a label, a VPN identifier, and a list of addresses, in step 1026, an intermediate device allocates a label for the previous hop LSP segment on the forward path, in step 1028, removes the last address from the list of addresses to form a list of remaining addresses, in step 1030, sends to the last address from the list of addresses a NHRP Resolution Reply message including the label, the VPN identifier, and the list of remaining addresses, in step 1032, and terminates in step 1034.

In the various embodiments described above, NHRP is used to create a unidirectional path (i.e., the forward path) from the ingress device to the egress device. However, NHRP can also be used to create bi-directional paths (i.e., a forward path and a return path) between the ingress device and the egress device. The various mechanisms described above allow label mapping information to be distributed to all devices along the forward path. In order to distribute label mapping information to all devices along the return path, an exemplary embodiment of the present invention includes label mapping information in the NHRP Resolution Request messages that are forwarded along the forward path, for example, in the VPN-ID TLV field 400. Specifically, the ingress device allocates a label for next hop LSP segment on the return path, and sends to the next hop device on the forward path a NHRP Resolution Request message including the label for the next hop LSP segment on the return path and a VPN identifier, and also indicating that bi-directional paths should be created. Each intermediate device along the forward path extracts the return path label from the NHRP Resolution Request message, allocates a label for the next hop LSP segment on the return path, and sends to the next hop device a NHRP Resolution Request message including the label for the next hop LSP segment on the return path and a VPN identifier. The egress device extracts the return path label from the NHRP Resolution Request message, allocates a label for the previous hop LSP segment on the forward path, and sends the label along with the VPN identifier to the previous hop device on the forward path in a NHRP reply message (i.e., either a NHRP Resolution Reply message or a NHRP Label Mapping message, as described above).

Figure 11:
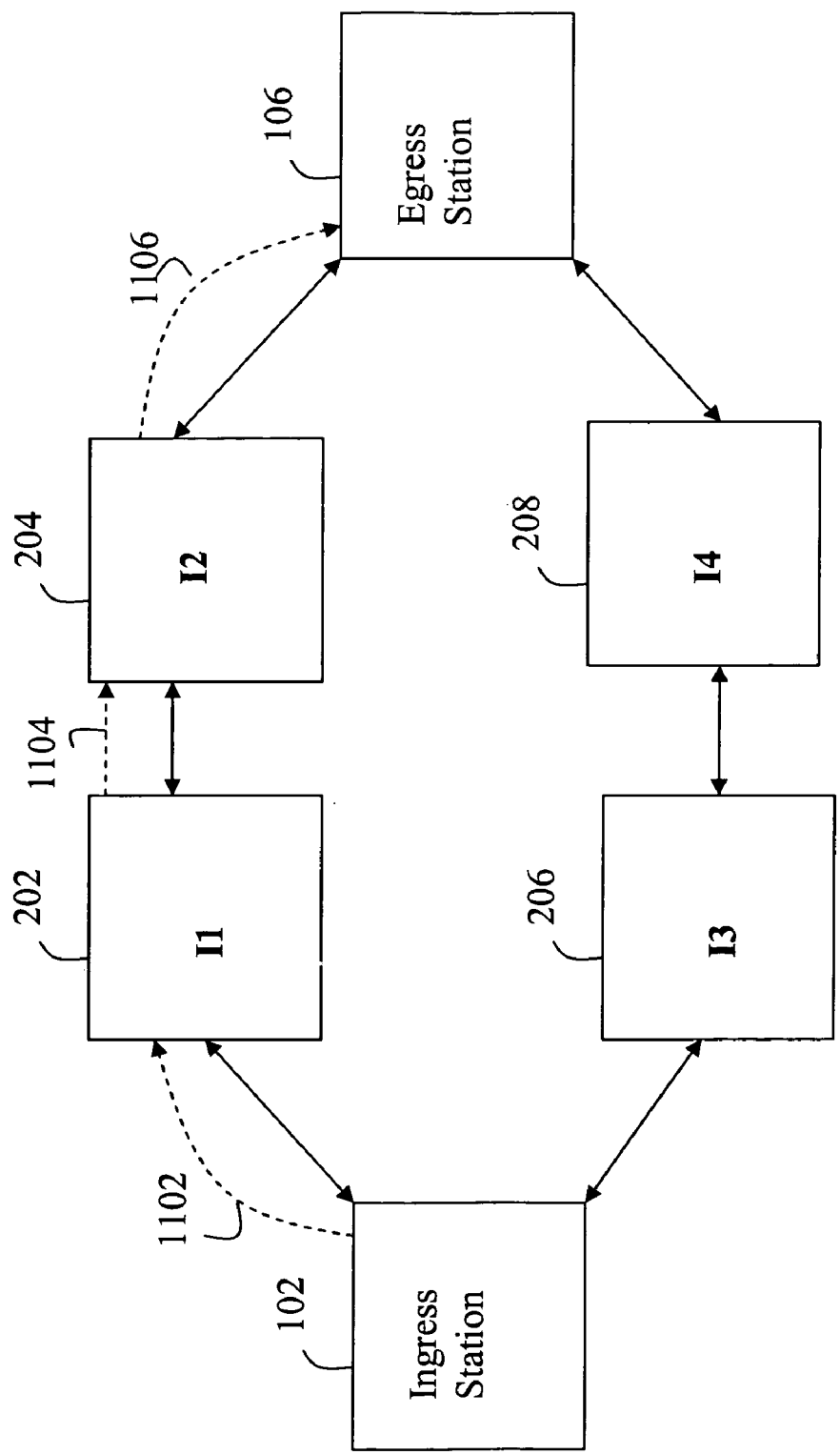
FIG. 11 is a block diagram showing an exemplary communication system for creating bi-directional paths in accordance with an embodiment of the present invention.

FIG. 11 shows an exemplary communication system for creating bi-directional paths. The Ingress Station 102 allocates a label for the return path from the intermediate device I1 (202), and sends to the intermediate device I1 (202) a NHRP Resolution Request message 1102 including the return path label and the VPN identifier. Upon receiving the NHRP Resolution Request message 1102, the intermediate device I1 (202) extracts the return path label from the NHRP Resolution Request message, allocates a label for the return path from the intermediate device I2 (204), and sends to the intermediate device I2 (204) a NHRP Resolution Request message 1104 including the return path label and the VPN identifier. Upon receiving the NHRP Resolution Request message 1104, the intermediate device I2 (204) extracts the return path label from the NHRP Resolution Request message, allocates a label for the return path from the Egress Station 106, and sends to the Egress Station 106 a NHRP Resolution Request message 1106 including the return path label and the VPN identifier.

In a preferred embodiment of the present invention, predominantly all of the logic for supporting VPNs in a label switched communication system is implemented as a set of computer program instructions that are stored in a computer readable medium and executed by an embedded microprocessor system within the various MPLS devices, including the ingress device, the intermediate devices, and the egress device. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for supporting virtual private networks in a label switched communication system having an ingress device in communication with an egress device via a number of intermediate devices by including label information and a virtual private network identifier in Next Hop Resolution Protocol messages, the virtual private network identifier identifying a virtual private network, and using said Next Hop Resolution Protocol messages to dynamically establish a label switched path for the virtual private network. The label information and the virtual private network identifier may be included within a Next Hop Resolution Protocol message in a type-length-value field having at least a virtual private network identifier field for carrying the virtual private network identifier and a label information field for carrying the label information.

The method may be used to dynamically establish a label switched path for a forward path from the ingress device to the egress device for the virtual private network, specifically by sending a Next Hop Resolution Protocol request message by the ingress device, forwarding the Next Hop Resolution Protocol request message hop-by-hop from the ingress device to the egress device by each intermediate device that is on the forward path, sending a Next Hop Resolution Protocol reply message by the egress device, and forwarding the Next Hop Resolution Protocol reply message hop-by-hop from the egress device to the ingress device by each intermediate device that is on the forward path. In order to forward Next Hop Resolution Protocol messages, each intermediate device may maintain previous hop state information, in which case each intermediate device forwards the NHRP reply message based upon the previous hop state information, or else each intermediate device may insert its address into a forward path address list in the NHRP request message, in which case each intermediate device forwards the NHRP reply message based upon a return path address list in the NHRP reply message. The egress device allocates a forward path label for a label switched path segment from the previous hop device on the forward path to the egress device, and includes the forward path label in the NHRP reply message. Each intermediate device allocates a forward path label for a label switched path segment from the previous hop device on the forward path to the intermediate device, and includes the forward path label in the NHRP reply message.

The method may also be used to dynamically establish a label switched path for a return path from the egress device to the ingress device, specifically by sending a NHRP request message by the ingress device and forwarding the NHRP request message hop-by-hop from the egress device to the ingress device by each intermediate device that is on the forward path. The ingress device allocates a return path label for a label switched path segment from a next hop device on the forward path to the ingress device, and includes the return path label in the NHRP request message. Each intermediate device on the forward path allocates a return path label for a label switched path segment from a next hop device on the forward path to the intermediate device, and includes the return path label in the NHRP request message.

The present invention may also be embodied as a device for supporting virtual private networks in a label switched communication system. The device includes label switching logic for establishing a label switched path for the virtual private network using Next Hop Resolution Protocol messages, wherein the label switching logic includes a label request and a virtual private network identifier in Next Hop Resolution Protocol request messages, and wherein the label switching logic includes label mapping information and the virtual private network identifier in Next Hop Resolution Protocol reply messages.

An ingress device includes transmitting logic for transmitting to a next hop device in the communication network a Next Hop Resolution Protocol request message including a label request and the virtual private network identifier and receiving logic for receiving from said next hop device in the communication network a Next Hop Resolution Protocol reply message including a forward path label for a label switched path segment to said next hop device in the communication network and the virtual private network identifier. The label switching logic establishes a label switched path to said next hop device in the communication network using said forward path label. The ingress device may also include return path label allocation logic for allocating a return path label for a label switched path segment from the next hop device in the communication network to the ingress device. The ingress device includes the return path label in addition to the label request and the virtual private network identifier in the NHRP request message.

An intermediate device includes request message receiving logic for receiving from a previous hop device in the communication network a first Next Hop Resolution Protocol request message including a label request and the virtual private network identifier, request message transmitting logic for transmitting to a next hop device in the communication network a second Next Hop Resolution Protocol request message including the label request and the virtual private network identifier, reply message receiving logic for receiving from said next hop device in the communication network a first Next Hop Resolution Protocol reply message including label mapping information and the virtual private network identifier, forward path label allocation logic for allocating a forward path label for a label switched path segment from the previous hop device in the communication network, and reply message transmitting logic for transmitting to said previous hop device in the communication network a second Next Hop Resolution Protocol reply message including said forward path label and the virtual private network identifier.

In order to forward NHRP messages, the request message receiving logic may maintain previous hop state information for said previous hop device in the communication network upon receiving the first NHRP request message, in which case the reply message transmitting logic transmits the second NHRP reply message to said previous hop device in the communication network based upon the previous hop state information. Alternatively, the request message transmitting logic may insert a device address into a forward path address list and include the forward path address list in the second NHRP request message, in which case the reply message transmitting logic transmits the second NHRP reply message to said previous hop device in the communication network based upon a previous hop device address in a return path address list in the NHRP reply message.

The intermediate device may receive a forward path label in the first NHRP reply message for a label switched path segment from the intermediate device to said next hop device in the communication network, in which case the label switching logic establishes a label switched path to said next hop device in the communication network using said forward path label.

The intermediate device may receive a return path label in the first NHRP request message for a label switched path segment from the intermediate device to said previous hop device in the communication network, in which case the label switching logic establishes a label switched path to said previous hop device in the communication network using said return path label.

The intermediate device may also include return path label allocation logic for allocating a return path label for a label switched path segment from said next hop device in the communication network to the intermediate device. The intermediate device includes the return path label in addition to the label request and the virtual private network indicator in the second NHRP request message.

An egress device includes receiving logic for receiving from a previous hop device in the communication network a Next Hop Resolution Protocol request message including a label request and the virtual private network identifier, forward path label allocation logic for allocating a forward path label for a label switched path segment from said previous hop device in the communication network, and transmitting logic for transmitting to said previous hop device in the communication network a Next Hop Resolution Protocol reply message including said forward path label and the virtual private network identifier. The egress device may receive a forward path address list in the NHRP request message, in which case the egress device includes a return path address list in the NHRP reply message. The egress device may receive a return path label in the NHRP request message for a label switched path segment from the egress device to said previous hop device in the communication network, in which case the label switching logic establishes a label switched path to said previous hop device in the communication network using said return path label.

The present invention may also be embodied as a program product comprising a computer readable medium having embodied therein a computer program for supporting virtual private networks in a label switched communication system, the computer program comprising label switching logic programmed to establish a label switched path for the virtual private network using Next Hop Resolution Protocol messages, wherein the label switching logic is programmed to include a label request and a virtual private network identifier in Next Hop Resolution Protocol request messages, and wherein the label switching logic is programmed to include label mapping information and the virtual private network identifier in Next Hop Resolution Protocol reply messages.

The present invention may also be embodied as a communication system comprising an ingress device in communication with an egress device via a number of intermediate devices, wherein a label switched path is established for a virtual private network by including label information and a virtual private network identifier in Next Hop Resolution Protocol messages and using said Next Hop Resolution Protocol messages to dynamically establish the label switched path for the virtual private network.

The present invention may be embodied in other specific forms without departing from the essence or essential characteristics. The described embodiments are to be considered in all respects only as illustrative and not restrictive.

We claim:

1. A method for supporting virtual private networks in a label switched communication system having an ingress device in communication with an egress device via a number of intermediate devices, the method comprising:
   including label information and a virtual private network identifier in Next Hop Resolution Protocol messages, the virtual private network identifier identifying a virtual private network; and
   using said Next Hop Resolution Protocol messages to dynamically establish a label switched path for the virtual private network.

2. The method of claim 1, wherein the label information and the virtual private network identifier is included within a Next Hop Resolution Protocol message in a type-length-value field having at least a virtual private network identifier field for carrying the virtual private network identifier and a label information field for carrying the label information.

3. The method of claim 1, wherein using said Next Hop Resolution Protocol messages to dynamically establish a label switched path for the virtual private network comprising using said Next Hop Resolution Protocol messages to dynamically establish a label switched path for a forward path from the ingress device to the egress device for the virtual private network.

4. The method of claim 3, wherein using said Next Hop Resolution Protocol messages to dynamically establish the label switched path for the forward path from the ingress device to the egress device for the virtual private network comprises:
   sending a Next Hop Resolution Protocol request message by the ingress device;
   forwarding the Next Hop Resolution Protocol request hop-by-hop from the ingress device to the egress device by each immediate device that is on the forward path;
   sending a Next Hop Resolution Protocol reply message by the egress device; and
   forwarding the Next Hop Resolution Protocol reply message hop-by-hop from the egress device to the ingress device by each intermediate device that is on the forward path.

5. The method of claim 4, wherein the Next Hop Resolution Protocol request message is a Next Hop Resolution Protocol Resolution Request message, and wherein the label information comprises a label request.

6. The method of claim 4, wherein the Next Hop Resolution Protocol reply message is a Next Hop Resolution Protocol Resolution Reply message, and wherein the label information comprises label mapping information.

7. The method of claim 4, wherein the Next Hop Resolution Protocol reply message is a Next Hop Resolution Protocol Label Mapping message, and wherein the label information comprises label mapping information.

8. The method of claim 4, wherein forwarding the Next Hop Resolution Protocol request message by an intermediate device comprises:
   receiving the Next Hop Resolution Protocol request message from a previous hop device on the forward path;
   maintaining previous hop state information for said previous hop device; and
   forwarding the Next Hop Resolution Protocol request message to a next hop device on the forward path.

9. The method of claim 8, wherein forwarding the Next Hop Resolution Protocol reply message by an intermediate device comprises:
   receiving a first Next Hop Resolution Protocol reply message from a next hop device on the forward path;
   allocating a forward path label for a label switched path segment from a previous hop device on the forward path to said intermediate device; and
   sending a second Next Hop Resolution Protocol reply message including said forward path label and the virtual private network identifier to said previous hop device on the forward path based upon the previous hop state information.

10. The method of claim 4, wherein forwarding the Next Hop Resolution Protocol request message by an intermediate device comprises:
    receiving the Next Hop Resolution Protocol request message from a previous hop device on the forward path, the Next Hop Resolution Protocol request message including a forward path address list;
    adding an intermediate device address to the forward path address list in the Next Hop Resolution Protocol request message; and
    forwarding the Next Hop Resolution Protocol request message including the forward path address list to a next hop device on the forward path.

11. The method of claim 10, wherein the forward path address list comprises a Next Hop Resolution Protocol Forward Transit NHS Record Extension field.

12. The method of claim 4, wherein forwarding the Next Hop Resolution Protocol reply message by an intermediate device comprises:
    receiving a first Next Hop Resolution Protocol reply message from a next hop device on the forward path, the Next Hop Resolution Protocol reply message including a return path address list including at least an address of a previous hop device on the forward path;
    allocating a forward path label for a label switched path segment from a previous hop device on the forward path to said intermediate device; and
    sending a second Next Hop Resolution Protocol reply message including said forward path label and the virtual private network identifier to said previous hop device on the forward path based upon the address in the return path address list.

13. The method of claim 4, wherein sending a Next Hop Resolution Protocol reply message by the egress device comprises:
    receiving the Next Hop Resolution Protocol request message from a previous hop device on the forward path;
    allocating a forward path label for a label switched path segment from said previous hop device on the forward path to the egress device; and
    sending the Next Hop Resolution Protocol reply message including said forward path label and the virtual private network identifier to said previous hop device on the forward path.

14. The method of claim 13, wherein the Next Hop Resolution Protocol request message including a forward path address list including at least an address of the previous hop device on the forward path, and wherein sending the Next Hop Resolution Protocol reply message to the previous hop device on the forward path comprises sending the Next Hop Resolution Protocol reply message to the previous hop device on the forward path based upon the address in the forward path address list.

15. The method of claim 1, wherein using said Next Hop Resolution Protocol messages to dynamically establish a label switched path for the virtual private network comprises using said Next Hop Resolution Protocol messages to dynamically establish a label switched path for a return path from the egress device to the ingress device for the virtual private network.

16. The method of claim 15, wherein using said Next Hop Resolution Protocol messages to dynamically establish the label switched path for the return path from the egress device to the ingress device for the virtual private network comprises:
   sending a Next Hop Resolution Protocol request message by the ingress device; and
   forwarding the Next Hop Resolution Protocol request message hop-by-hop from the egress device to the ingress device by each intermediate device that is on the forward path.

17. The method of claim 15, wherein sending the Next Hop Resolution Protocol request message by the ingress device comprises:
   allocating a return path label for a label switched path segment from a next hop device on the forward path to the ingress device; and
   sending the Next Hop Resolution Protocol request message including said return path label and the virtual private network identifier to said next hop device on the forward path.

18. The method of claim 15, wherein forwarding the Next Hop Resolution Protocol request message by an intermediate device comprises:
   receiving a first Next Hop Resolution Protocol request message from a previous hop device on the forward path;
   allocating a return path label for a label switched path segment from a next hop device on the forward path to the intermediate device; and
   sending a second Next Hop Resolution Protocol request message including said return path label and the virtual private network identifier to said next hop device on the forward path.

19. A device for supporting virtual private networks in a label switched communication system, the device comprising label switching logic operably coupled to establish a label switched path for the virtual private network using Next Hop Resolution Protocol messages, wherein the label switching logic including a label request and a virtual private network identifier in Next Hop Resolution Protocol request messages, and wherein the label switching logic includes label mapping information and the virtual private network identifier in Next Hop Resolution Protocol reply messages.

20. The device of claim 19, wherein the label switching logic comprises:
   transmitting logic operably coupled to transmit to a next hop device in the communication network a Next Hop Resolution Protocol request message including a label request and the virtual private network identifier; and
   receiving logic operably coupled to receive from said next hop device in the communication network a Next Hop Resolution Protocol reply message including a forward path label for a label switched path segment to said next hop device in the communication network and the virtual private network identifier.

21. The device of claim 20, wherein the label switching logic is operably coupled to establish the label switched path to said next hop device in the communication network using said forward path label.

22. The device of claim 20, wherein the label switching logic further comprises return path label allocation logic operably coupled to allocate a return path label for a label switched path segment from said next hop device in the communication network, and wherein the transmitting logic is operably coupled to transmit to said next hop device in the communication network the Next Hop Resolution Protocol request message including said return path label in addition to the label request and the virtual private network identifier.

23. The device of claim 19, wherein the label switching logic comprises:
   request message receiving logic operably coupled to receive from a previous hop device in the communication network a first Next Hop Resolution Protocol request message including a label request and the virtual private network identifier;
   reply message receiving logic operably coupled to receive from said next hop device in the communication network a Next Hop Resolution Protocol reply message including label mapping information and the virtual private network identifier;
   forward path label allocation logic operably coupled to allocate a forward path label for a label switched path segment from the previous hop device in the communication network; and
   reply message transmitting logic operably coupled to transmit to said previous hop device in the communication network a second Next Hop Resolution Protocol reply message including said forward path label and the virtual private network identifier.

24. The device of claim 23, wherein the request message receiving logic is operably coupled to maintain previous hop state information for said previous hop device in the communication network, and wherein the reply message transmitting logic is operably coupled to transmit the second Next Hop Resolution Protocol reply message to said previous hop device in the communication network based upon the previous hop state information.

25. The device claim 23, wherein the first Next Hop Resolution Protocol request message includes a forward path address list, and wherein the label switching logic is operably coupled to insert a device address into the forward path address list and include the forward path address list in the second Next Hop Resolution Protocol request message.

26. The device of claim 25, wherein the forward path address list comprises a Next Hop Resolution Protocol Forward Transit NHS Record Extension field.

27. The device of claim 25, wherein the first Next Hop Resolution Protocol reply message includes a return path address list including at least an address for said previous hop device in the communication network, and wherein the reply message transmitting logic is operably coupled to transmit the second Next Hop Resolution Protocol reply message to said previous hop device in the communication network based upon the address in the list of addresses.

28. The device of claim 27, wherein the reply message transmitting logic is operably coupled to remove an address from the return path address list to form a modified return path address list and to include the modified return path address list in the second Next Hop Resolution Protocol reply message.

29. The device of claim 23, wherein the first Next Hop Resolution Protocol request message includes a return path label for a label switched path segment to said previous hop device, and wherein a label switching logic is operably coupled to establish a label switched path to said previous hop device using said return path label.

30. The device of claim 23, wherein the label switching logic further comprises return path label allocation logic operably coupled to allocate a return path label for a label switched path segment rom said next hop device in the communication network, and wherein the request message transmitting logic is operably coupled to transmit to said next hop device in the communication network the second Next Hop Resolution Protocol request message including said return path label in addition to the label request and the virtual private network indicator.

31. The device of claim 19, wherein the label switching logic comprises:
   receiving logic operably coupled to receive from a previous hop device in the communication network a Next Hop Resolution Protocol request message including a label request and the virtual private network identifier;
   forward path label allocation logic operably coupled to allocate a forward path label for a label switched path segment from said previous hop device in the communication network; and
   transmitting logic operably coupled to transmit to said previous hop device in the communication network a Next Hop Resolution Protocol reply message including said forward path label and the virtual private network identifier.

32. The device of claim 31, wherein the Next Hop Resolution Protocol request message includes a forward path address list, and wherein the transmitting logic is operably coupled to include the forward path address list as a return path address list in the Next Hop Resolution Protocol reply message.

33. The device of claim 31, wherein the Next Hop Resolution Protocol request message includes a return path label for a label switched path segment to said previous hop device in the communication network, and wherein the label switching logic is operably coupled to establish the label switched path to said previous hop device in the communication network using said return path label.

34. The device of claim 19, wherein the Next Hop Resolution Protocol request messages comprise Next Hop Resolution Protocol Resolution Request messages.

35. The device of claim 19, wherein the Next Hop Resolution Protocol reply messages comprise one of:
   Next Hop Resolution Protocol Reply messages; and
   Next Hop Resolution Protocol Label Mapping messages.

36. A communication system comprising an ingress device in communication with an egress device via a number of intermediate devices, wherein a label switched path is established for a virtual private network by including label information and a virtual private network identifier in Next Hop Resolution Protocol messages and using said Next Hop Resolution Protocol messages to dynamically establish the label switched path for the virtual private network.

37. The communication system of claim 36, wherein:
   the ingress device sends a Next Hop Resolution Protocol request message including at least a label request and the virtual private network identifier to a next hop device on a forward path from the ingress device to the egress device;
   each intermediate device on the forward path forwards the Next Hop Resolution Protocol request message to a next hop device on the forward path;
   the egress device send s Next Hop Resolution Protocol reply message including at least forward path label mapping information and the virtual private network identifier to a previous hop device on the forward path; and
   each intermediate device on the forward path forwards the Next Hop Resolution Protocol reply message to a previous hop device on the forward path.

38. The communication system of claim 36, wherein the ingress device further includes return path label mapping information in the Next Hop Resolution Protocol request message, and wherein each intermediate device on the forward path further includes return path label mapping information in the Next Hop Resolution Protocol request message.

* * * * *

UNITED STATES PATENT AND TRADEMARK OFFICE
CERTIFICATE OF CORRECTION

| | | |
|---|---|---|
| PATENT NO. | : 7,174,388 B2 | Page 1 of 1 |
| APPLICATION NO. | : 11/301162 | |
| DATED | : February 6, 2007 | |
| INVENTOR(S) | : Lucaini et al. | |

It is certified that error appears in the above-identified patent and that said Letters Patent is hereby corrected as shown below:

At column 21, line 1, delete "rom" and insert therefore --from--.

Signed and Sealed this

Third Day of July, 2007

JON W. DUDAS
*Director of the United States Patent and Trademark Office*